United States Patent
Qian et al.

(10) Patent No.: US 11,887,284 B2
(45) Date of Patent: Jan. 30, 2024

(54) METHODS AND SYSTEMS FOR IMAGE COMBINATION

(71) Applicant: ZHEJIANG DAHUA TECHNOLOGY CO., LTD., Zhejiang (CN)

(72) Inventors: Yong Qian, Hangzhou (CN); Junjun Yu, Hangzhou (CN); Wei Fang, Hangzhou (CN); Yinchang Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 349 days.

(21) Appl. No.: 17/444,563

(22) Filed: Aug. 6, 2021

(65) Prior Publication Data

US 2021/0374922 A1 Dec. 2, 2021

Related U.S. Application Data

(63) Continuation of application No. PCT/CN2019/116268, filed on Nov. 7, 2019.

(30) Foreign Application Priority Data

Apr. 15, 2019 (CN) .......................... 201910300030.7

(51) Int. Cl.
*G06T 5/00* (2006.01)
*H04N 23/73* (2023.01)
*H04N 23/741* (2023.01)

(52) U.S. Cl.
CPC ............. *G06T 5/007* (2013.01); *H04N 23/73* (2023.01); *H04N 23/741* (2023.01);
(Continued)

(58) Field of Classification Search
CPC ..................... G06T 5/007; G06T 5/009; G06T 2207/10144; G06T 2207/20021;
(Continued)

(56) References Cited

U.S. PATENT DOCUMENTS

| | | | | |
|---|---|---|---|---|
| 5,420,635 A | * | 5/1995 | Konishi | ............... H04N 23/741 |
| | | | | 348/E5.037 |
| 8,159,579 B2 | * | 4/2012 | Jannard | ................ H04N 25/531 |
| | | | | 348/222.1 |

(Continued)

FOREIGN PATENT DOCUMENTS

| | | | | |
|---|---|---|---|---|
| CN | 102970549 A | * | 3/2013 | ............. G06T 5/009 |
| CN | 103581535 A | | 2/2014 | |

(Continued)

OTHER PUBLICATIONS

The Extended European Search Report in European Application No. 19924978.0 dated Feb. 7, 2022, 11 pages.
(Continued)

*Primary Examiner* — Manav Seth
(74) *Attorney, Agent, or Firm* — METIS IP LLC

(57) ABSTRACT

A method for image combination may include obtaining a first image and a second image; dividing the first image into a plurality of first image blocks and dividing the second image into a plurality of second image blocks; for each of the plurality of first image blocks, determining a first block weight based on edge information of the first image block and determining a second block weight based on overall information of the first image block; for each of the plurality of second image blocks, determining a third block weight based on overall information of the second image block; determining an exposure gain ratio based on the second block weights and the third block weights; determining a first combination weight and a second combination weight based on the exposure gain ratio; generating a third image
(Continued)

based on the first combination weights and the second combination weights.

20 Claims, 10 Drawing Sheets

(52) U.S. Cl.
CPC ............... *G06T 2207/10144* (2013.01); *G06T 2207/20021* (2013.01); *G06T 2207/20208* (2013.01)

(58) Field of Classification Search
CPC .......... G06T 2207/20208; H04N 23/73; H04N 23/70; H04N 23/741; H04N 23/743; H04N 1/3871; H04N 23/533; H04N 25/583; H04N 25/585
See application file for complete search history.

(56) References Cited

U.S. PATENT DOCUMENTS

| | | | | |
|---|---|---|---|---|
| 8,300,110 | B2 * | 10/2012 | Hatanaka | H04N 23/70 348/208.99 |
| 8,373,776 | B2 * | 2/2013 | Iijima | H04N 23/70 348/241 |
| 8,743,241 | B2 | 6/2014 | Lesiak et al. | |
| 8,913,153 | B2 * | 12/2014 | Li | H04N 23/73 348/222.1 |
| 9,560,290 | B2 * | 1/2017 | Jo | H04N 23/81 |
| 9,883,125 | B2 * | 1/2018 | Li | H04N 23/73 |
| 10,750,098 | B2 * | 8/2020 | Fujinami | H04N 5/144 |
| 11,758,297 | B2 * | 9/2023 | Gutierrez Barragan | H04N 25/585 348/208.1 |
| 2008/0187235 | A1 | 8/2008 | Wakazono et al. | |
| 2010/0002106 | A1 | 1/2010 | Granquist-Fraser | |
| 2010/0295932 | A1 * | 11/2010 | Yokomachi | G06T 5/008 348/E5.037 |
| 2012/0002082 | A1 | 1/2012 | Johnson et al. | |
| 2012/0281111 | A1 | 11/2012 | Jo et al. | |
| 2013/0120610 | A1 | 5/2013 | Tsubaki | |
| 2013/0271623 | A1 | 10/2013 | Jo | |
| 2014/0152686 | A1 | 6/2014 | Narasimha et al. | |
| 2014/0307044 | A1 | 10/2014 | Sharma et al. | |
| 2015/0195441 | A1 | 7/2015 | Chen et al. | |

FOREIGN PATENT DOCUMENTS

| | | | | |
|---|---|---|---|---|
| CN | 103942807 | A | | 7/2014 |
| CN | 103973990 | A | | 8/2014 |
| CN | 105491301 | A | | 4/2016 |
| CN | 105847703 | | | 8/2016 |
| CN | 106060418 | A | | 10/2016 |
| CN | 106157305 | A | | 11/2016 |
| CN | 107220931 | A | | 9/2017 |
| CN | 104639920 | B | | 1/2018 |
| CN | 108205796 | A | | 6/2018 |
| CN | 108259774 | A | | 7/2018 |
| CN | 111210891 | B | * | 8/2023 ............ G16H 20/30 |
| EP | 1944732 | A2 | * | 7/2008 ............ G06T 5/004 |
| EP | 2538661 | B1 | * | 7/2014 ............ H04N 5/2355 |
| EP | 3484141 | B1 | * | 2/2021 ............ G06T 5/007 |
| GB | 2595371 | A | * | 11/2021 ............ G02B 7/34 |
| JP | H0775026 | A | * | 3/1995 ............ H04N 5/335 |
| JP | 5682443 | B2 | * | 3/2015 ............ G06T 3/00 |
| WO | WO-2010071839 | A1 | * | 6/2010 ............ G06T 5/007 |
| WO | WO-2012015359 | A1 | * | 2/2012 ............ G06T 11/001 |
| WO | WO-2012049321 | A1 | * | 4/2012 ............ H04N 5/35554 |
| WO | WO-2012173571 | A1 | * | 12/2012 ............ G06T 5/009 |
| WO | 2015079481 | A1 | | 6/2015 |
| WO | 2020211334 | A1 | | 10/2020 |

OTHER PUBLICATIONS

International Search Report in PCT/CN2019/116268 dated Jan. 23, 2020, 4 pages.
Written Opinion in PCT/CN2019/116268 dated Jan. 23, 2020, 5 pages.
First Office Action in Chinese Application No. 201910300030.7 dated Dec. 4, 2019, 9 pages.

* cited by examiner

610
| 0 | 1 | 2 |
|---|---|---|
| 3 | 4 | 5 |
| 6 | 7 | 8 |
FIG. 6A
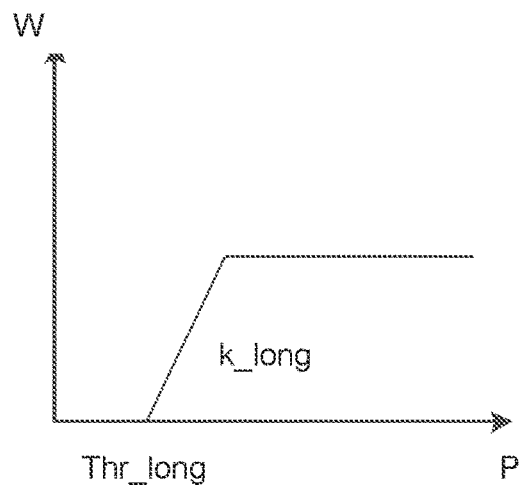
FIG. 6B
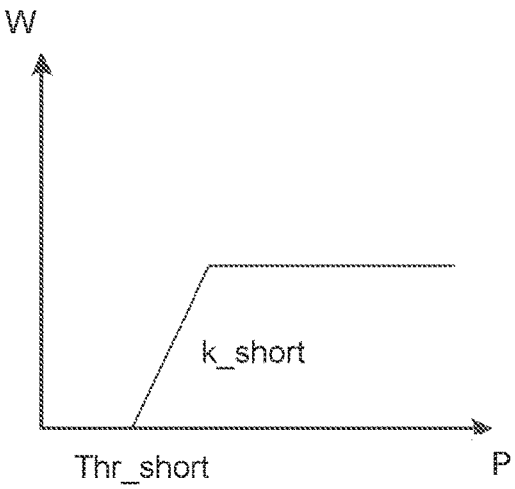
FIG. 6C

700

By traversing the first image and the second image, determining a first count, a second count, a first statistic, a second statistic, a third statistic, and a fourth statistic based on the second block weights of the plurality of first image blocks and the third block weights of the plurality of second image blocks — 710

Determining the exposure gain ratio based on the first count, the second count, the first statistic, the second statistic, the third statistic, and the fourth statistic — 720

Determining a reference gain ratio based on the first statistic, the second statistic, the third statistic, and the fourth statistic — 810

Modifying the exposure gain ratio based on the reference gain ratio — 820

FIG. 8

METHODS AND SYSTEMS FOR IMAGE COMBINATION

CROSS-REFERENCE TO RELATED APPLICATIONS

This application is a Continuation of International Application No. PCT/CN2019/116268, filed on Nov. 7, 2019, which claims priority of Chinese Patent Application No. 201910300030.7 filed on Apr. 15, 2019, the content of which is hereby incorporated by reference in its entirety.

TECHNICAL FIELD

The present disclosure generally relates to image processing, and more specifically relates to methods and systems for image combination.

BACKGROUND

In image processing, the dynamic range of an image is typically defined as the ratio of the largest luminance value to the smallest luminance value of pixels in the image. Compared to traditional images, high-dynamic range (HDR) images, also referred to as wide-dynamic range (WDR) images, provide a higher dynamic range and more details in highlights and/or shadows. With the development of computer and image processing technique, the technique for generating HDR images provides good solutions to capture HDR images. In HDR imaging, two or more low-dynamic range (LDR) images of a same scene are captured using different exposure times (e.g., relatively long exposure times and relatively short exposure times). An HDR image are generated by combining the two or more LDR images with different exposures (e.g., luminance ranges) using the technique for generating HDR images. In traditional techniques for generating HDR images, the two or more LDR images with different exposures are divided into a plurality of blocks. A weight is determined for each of the plurality of blocks. The HDR image are generated by combining the two or more LDR images based on the weights. The weight of a block may be determined based on the average value of pixel values of pixels of the block. Because the way of dividing the image into blocks may not be in accordance with the distribution of bright and dark areas in the image, there may be some problems in the combination of edges of the blocks during the process for generating the HDR image. In addition, the LDR image with longer exposure can present details of the darker region of the scene more clearly, but may include overexposure in the brighter region of the scene. If a part, with overexposure, of the LDR image with longer exposure is assigned to a relatively large weight, the generated HDR image may include one or more regions with relatively high luminance (e.g., a specular highlight), which reduces the quality of the generated HDR image. Therefore, it is desirable to provide systems and/or methods for image combination to generate high-quality HDR images.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, a system for image combination may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a first image and a second image of a same scene. The first image may be captured by an image sensor using a first exposure time. The second image may be captured by the image sensor using a second exposure time that is shorter than the first exposure time. The one or more processors may divide the first image into a plurality of first image blocks. The one or more processors may divide the second image into a plurality of second image blocks. Each of the plurality of second image blocks may correspond to one of the plurality of first image blocks. For each of the plurality of first image blocks, the one or more processors may determine a first block weight of the first image block based on edge information of the first image block and determining a second block weight of the first image block based on overall information of the first image block. For each of the plurality of second image blocks, the one or more processors may determine a third block weight of the second image block based on overall information of the second image block. The one or more processors may determine an exposure gain ratio based on the second block weights of the plurality of first image blocks and the third block weights of the plurality of second image blocks. The one or more processors may determine a first combination weight for each of the plurality of first image blocks and a second combination weight for the corresponding second image block based on the first block weight of the first image block, the third block weight of the corresponding second image block, and the exposure gain ratio. A sum of the first combination weight of the first image block and the second combination weight of the corresponding second image block may be a fixed value. The one or more processors may generate a third image by combining the first image and the second image based on the first combination weights of the plurality of first image blocks and the second combination weights of the plurality of second image blocks.

In some embodiments, to determine the first block weight for each of the plurality of first image blocks based on the edge information of the first image block, the one or more processors may determine at least one edge pixel group, the edge pixel group including a corner pixel of the first image block and pixels of the first image block adjacent to the corner pixel. For each of the at least one edge pixel group, the one or more processors may determine a sum of pixel values of the pixels in the edge pixel group. The one or more processors may determine a maximum among the sums of pixel values of the at least one edge pixel group. The one or more processors may determine the first block weight based on the maximum and one or more center pixels of the first image block.

In some embodiments, the first block weight may be determined based on:

$$P1\_max = (L\text{sum}\_max + Lc)/n,$$

wherein $P1\_max$ refers to the first block weight; $L\text{sum}\_max$ refers to the maximum among the sums of pixel values of the at least one edge pixel group; Lc refers to a pixel value of the center pixel; and n refers to a total count of pixels in the edge pixel group and the center pixel.

In some embodiments, to determine the second block weight for each of the plurality of first image blocks based on the overall information of the first image block, the one or more processors may determine the second block weight by determining a weighted average of pixel values of pixels in the first image block. To determine the third block weight for each of the plurality of second image blocks based on the overall information of the second image block, the one or more processors may determine the third block weight by determining a weighted average of pixel values of pixels in the second image block.

In some embodiments, to determine the exposure gain ratio based on the second block weights of the plurality of first image blocks and the third block weights of the plurality of second image blocks, by traversing the first image and the second image, the one or more processors may determine a first count. The first count may be a count of second block weights that are larger than a first threshold and less than a second threshold. The one or more processors may determine a second count. The second count may be a count of second block weights that are larger than or equal to the second threshold and less than or equal to a third threshold. The one or more processors may determine a first statistic. The first statistic may be a sum of second block weights that are larger than the first threshold and less than the second threshold. The one or more processors may determine a second statistic. The second statistic may be a sum of third block weights corresponding to the second block weights that are larger than the first threshold and less than the second threshold. The one or more processors may determine a third statistic. The third statistic may be a sum of second block weights that are larger than or equal to the second threshold and less than or equal to the third threshold. The one or more processors may determine a fourth statistic. The fourth statistic may be a sum of third block weights corresponding to the second block weights that are larger than or equal to the second threshold and less than or equal to the third threshold. The one or more processors may determine the exposure gain ratio by performing a linear fitting operation based on the first count, the second count, the first statistic, the second statistic, the third statistic, and the fourth statistic.

In some embodiments, the exposure gain ratio may be determined based on:

$$\text{gain}\_a = \frac{\frac{y2}{n2} - \frac{y1}{n1}}{\frac{x2}{n2} - \frac{x1}{n1}} = \frac{y2^*n1 - y1^*n2}{x2^*n1 - x1^*n2},$$

wherein gain_a refers to the exposure gain ratio; n1 refers to the first count; n2 refers to the second count; y1 refers to the first statistic; x1 refers to the second statistic; y2 refers to the third statistic; and x2 refers to the fourth statistic.

In some embodiments, to determine the exposure gain ratio based on the second block weights of the plurality of first image blocks and the third block weights of the plurality of second image blocks further, the one or more processors may determine a reference gain ratio based on the first statistic, the second statistic, the third statistic, and the fourth statistic. The one or more processors may determine a count of times that the exposure gain ratio is successively larger or successively smaller by comparing the exposure gain ratio to the reference gain ratio and a plurality of previous reference gain ratios, respectively. The reference gain ratio may relate to a current frame. The plurality of previous reference gain ratios may relate to a plurality of successive frames before the current frame. The one or more processors may determine whether the count of times is larger than a frame threshold. In response to a determination that the count of times that the exposure gain ratio is successively larger is greater than the frame threshold, the one or more processors may decrease the exposure gain ratio. In response to a determination that the count of times that the exposure gain ratio is successively smaller is greater than the frame threshold, the one or more processors may increase the exposure gain ratio.

In some embodiments, to determine the reference gain ratio based on the first statistic, the second statistic, the third statistic, and the fourth statistic, the one or more processors may determine a first gain ratio by determining a ratio of the first statistic to the second statistic. The one or more processors may determine a second gain ratio by determining a ratio of the third statistic to the fourth statistic. The one or more processors may determine a third gain ratio by determining an average of the first gain ratio and the second gain ratio. The one or more processors may determine a preliminary gain ratio based on the first exposure time and the second exposure time. The one or more processors may determine the reference gain ratio based on the first gain ratio, the second gain ratio, the third gain ratio, and the preliminary gain ratio.

In some embodiments, to determine the reference gain ratio based on the first gain ratio, the second gain ratio, the third gain ratio, and the preliminary gain ratio, the one or more processors may determine whether the preliminary gain ratio is between the first gain ratio and the second gain ratio. In response to a determination that the preliminary gain ratio is between the first gain ratio and the second gain ratio, the one or more processors may determine the preliminary gain ration as the reference gain ratio. In response to a determination that the preliminary gain ratio is outside a range between the first gain ratio and the second gain ratio, the one or more processors may determine whether an absolute value of a difference between the preliminary gain ratio and the third gain ratio is less than a fourth threshold. In response to a determination that the absolute value is less than the fourth threshold, the one or more processors may determine the preliminary gain ration as the reference gain ratio. In response to a determination that the absolute value is larger than or equal to the fourth threshold, the one or more processors may determine the third gain ration as the reference gain ratio.

In some embodiments, to determine the first combination weight for each of the plurality of first image blocks and the second combination weight for the corresponding second image block based on the first block weight of the first image block, the third block weight of the corresponding second image block, and the exposure gain ratio, the one or more processors may determine a first mapping weight by performing a first mapping operation based on the first block weight. The one or more processors may determine a second mapping weight by performing a second mapping operation based on the third block weight and the exposure gain ratio. The one or more processors may determine a product of the first mapping weight and the second mapping weight as the second combination weight. The one or more processors may determine a difference between the fixed value and the second combination weight as the first combination weight.

In some embodiments, the first mapping weight may be determined based on:

$$W1=(P1\_max-thr\_1)\times k\_1,$$

wherein W1 refers to the first mapping weight; P1_max refers to the first block weight of the first image block; thr_1 refers to a fifth threshold; and k_1 refers to a first mapping slope. The second mapping weight may be determined based on:

$$W2=(P3\times gain\_a-thr\_2)\times k\_2,$$

wherein W2 refers to the second mapping weight; P3 refers to the third block weight of the corresponding second image block; thr_2 refers to a sixth threshold; and k_2 refers to a second mapping slope.

In some embodiments, before generating the third image, for each of the plurality of first image blocks and the corresponding second image block, the one or more processors may determine, based on luminance information of the first image block, whether the first combination weight and the second combination weight are needed to be modified. In response to a determination that the first combination weight and the second combination weight are needed to be modified, the one or more processors may increase the second combination weight and decreasing the first combination weight.

In some embodiments, to determine, based on luminance information of the first image block, whether the first combination weight and the second combination weight are needed to be modified, the one or more processors may determine whether one or more modification conditions are satisfied. The one or more modification conditions may include that a count of pixels in the first image block of which luminance values are larger than a seventh threshold is greater than an eighth threshold. In response to a determination that the one or more modification conditions are satisfied, the one or more processors may determine that the first combination weight and the second combination weight are needed to be modified.

In some embodiments, the one or more modification conditions may further include that the first combination weight and the second combination weight are allowed to be modified, and/or that the first mapping weight is greater than a ninth threshold and the second mapping weight is less than a tenth threshold.

In some embodiments, to increase the second combination weight and the decreasing the first combination weight, the one or more processors may increase the second combination weight to a preset value. The one or more processors may modify the first combination weight to a value equal to a difference between the fixed value and the preset value.

In some embodiments, the third image may be generated using bilinear interpolation based on:

$$Newdata=\Sigma_{i=1}^{m}[(data\_2_i\times gain\_a)\times sw\_final\_2_p+data\_1_i\times sw\_final\_1_p],$$

wherein Newdata refers to pixel values of pixels in the third image; m refers to a count of the pixels in the third image, and m is an positive integer larger than 1; data_1$_i$ refers to a pixel value of a pixel i in the first image block p of the first image; data_2$_i$ refers to a pixel value of the pixel in the second image corresponding to the pixel i in the first image; gain_a refers to the exposure gain ratio; sw_final_1$_p$ refers to the first combination weight of the first image block p; sw_final_2$_p$ refers to the second combination weight of the second image block corresponding to the first image block p; and a sum of sw_final_1$_p$ and sw_final_2$_p$ is equal to the fixed value.

According to another aspect of the present disclosure, a method for image combination may include one or more of the following operations. One or more processors may obtain a first image and a second image of a same scene. The first image may be captured by an image sensor using a first exposure time. The second image may be captured by the image sensor using a second exposure time that is shorter than the first exposure time. The one or more processors may divide the first image into a plurality of first image blocks. The one or more processors may divide the second image into a plurality of second image blocks. Each of the plurality of second image blocks may correspond to one of the plurality of first image blocks. For each of the plurality of first image blocks, the one or more processors may determine a first block weight of the first image block based on edge information of the first image block and determining a second block weight of the first image block based on overall information of the first image block. For each of the plurality of second image blocks, the one or more processors may determine a third block weight of the second image block based on overall information of the second image block. The one or more processors may determine an exposure gain ratio based on the second block weights of the plurality of first image blocks and the third block weights of the plurality of second image blocks. The one or more processors may determine a first combination weight for each of the plurality of first image blocks and a second combination weight for the corresponding second image block based on the first block weight of the first image block, the third block weight of the corresponding second image block, and the exposure gain ratio. A sum of the first combination weight of the first image block and the second combination weight of the corresponding second image block may be a fixed value. The one or more processors may generate a third image by combining the first image and the second image based on the first combination weights of the plurality of first image blocks and the second combination weights of the plurality of second image blocks.

According to yet another aspect of the present disclosure, a system for image combination may include an image dividing module configured to divide the first image into a plurality of first image blocks and divide the second image into a plurality of second image blocks. Each of the plurality of second image blocks may correspond to one of the plurality of first image blocks. The system may also include a block weight determination module configured to, for each of the plurality of first image blocks, determine a first block weight of the first image block based on edge information of the first image block and determine a second block weight of the first image block based on overall information of the first image block, and for each of the plurality of second image blocks, determine a third block weight of the second image block based on overall information of the second image block. The system may also include a gain ratio determination module configured to determine an exposure gain ratio based on the second block weights of the plurality of first image blocks and the third block weights of the plurality of second image blocks. The system may also include a combination weight determination module configured to determine a first combination weight for each of the plurality of first image blocks and a second combination weight for the corresponding second image block based on the first block weight of the first image block, the third block weight of the corresponding second image block, and the exposure gain ratio. A sum of the first combination weight of the first image block and the second combination weight of the corresponding second image block may be a fixed value. The system may also include a combination module configured to generate a third image by combining the first image and the second image based on the first combination weights of the plurality of first image blocks and the second combination weights of the plurality of second image blocks.

According to yet another aspect of the present disclosure, a non-transitory computer readable medium may comprise at least one set of instructions. The at least one set of instructions may be executed by one or more processors of a computer server. The one or more processors may obtain a first image and a second image of a same scene. The first image may be captured by an image sensor using a first exposure time. The second image may be captured by the image sensor using a second exposure time that is shorter than the first exposure time. The one or more processors may divide the first image into a plurality of first image blocks. The one or more processors may divide the second image into a plurality of second image blocks. Each of the plurality of second image blocks may correspond to one of the plurality of first image blocks. For each of the plurality of first image blocks, the one or more processors may determine a first block weight of the first image block based on edge information of the first image block and determining a second block weight of the first image block based on overall information of the first image block. For each of the plurality of second image blocks, the one or more processors may determine a third block weight of the second image block based on overall information of the second image block. The one or more processors may determine an exposure gain ratio based on the second block weights of the plurality of first image blocks and the third block weights of the plurality of second image blocks. The one or more processors may determine a first combination weight for each of the plurality of first image blocks and a second combination weight for the corresponding second image block based on the first block weight of the first image block, the third block weight of the corresponding second image block, and the exposure gain ratio. A sum of the first combination weight of the first image block and the second combination weight of the corresponding second image block may be a fixed value. The one or more processors may generate a third image by combining the first image and the second image based on the first combination weights of the plurality of first image blocks and the second combination weights of the plurality of second image blocks.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6A is a schematic diagram illustrating an example of a first image block 610 according to some embodiments of the present disclosure;

FIG. 6B is a schematic diagram illustrating an example of a mapping curve between a first mapping weight and a first block weight according to some embodiments of the present disclosure;

FIG. 6C is a schematic diagram illustrating an example of a mapping curve between a second mapping weight and a third block weight according to some embodiments of the present disclosure;

FIG. 7 is a flowchart illustrating an exemplary process for determining an exposure gain ratio according to some embodiments of the present disclosure;

FIG. 8 is a flowchart illustrating an exemplary process for modifying a determined exposure gain ratio according to some embodiments of the present disclosure;

DETAILED DESCRIPTION

Figure 1:
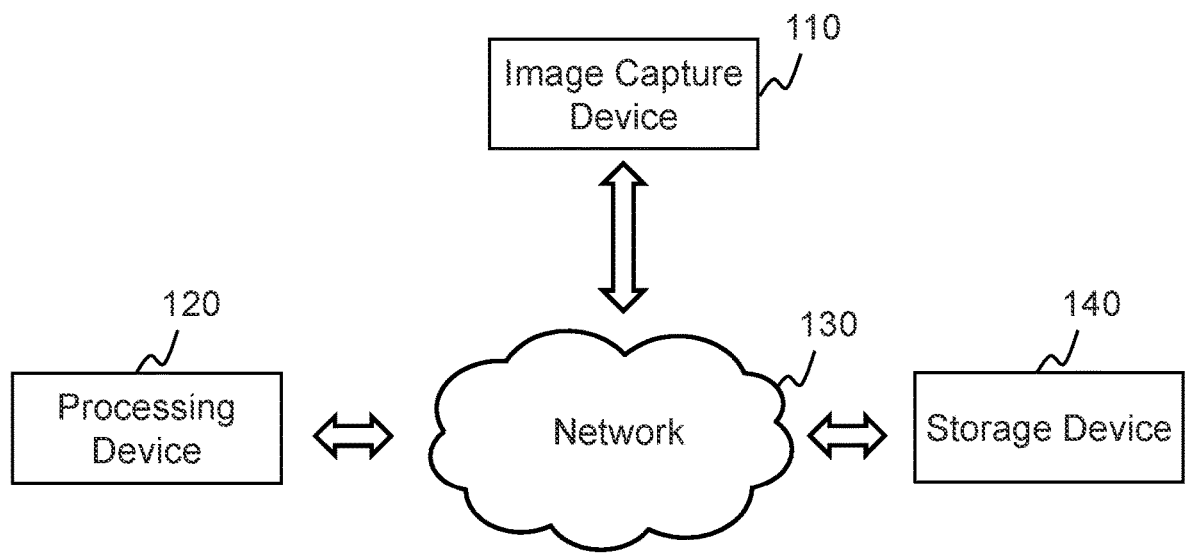
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The present disclosure provides systems and/or methods for image combination. The systems and/or methods may determine an exposure gain ratio based on a first image and a second image. The systems and/or methods may determine, based on the exposure gain ratio, first combination weights of the plurality of first image blocks of the first image and second combination weights of the plurality of second image blocks of the second image. The systems and/or methods may generate a third image by combining the first image and the second image based on the first combination weights and second combination weights. The systems and/or methods may determine the exposure gain ratio by considering edge information of the plurality of first image blocks, which may reduce the problems in the combination of edges of the image blocks. Alternatively or additionally, the systems and/or methods may modify the determined exposure gain ratio based on an algorithm relating to successive frames and/or adaptive adjustment, which may lead to a more accurate exposure gain ratio and improve the quality of the combined image. Alternatively or additionally, the systems and/or methods may modify the determined first and second combination weights based on luminance information of the first image, which may reduce or avoid one or more regions with relatively high luminance (e.g., a specular highlight) in the combined image.

FIG. 1 is a schematic diagram illustrating an exemplary imaging system 100 according to some embodiments of the present disclosure. In some embodiments, at least part of the imaging system 100 may be implemented with an electronic device that needs to capture images or videos, for example, a digital camera, a video camera, a smartphone, a monitoring device, or the like. As illustrated in FIG. 1, the imaging system 100 may include an image capture device 110, a processing device 120, a network 130, and a storage device 140.

The image capture device 110 may be configured to capture images or videos. The images or videos may be two-dimensional (2D) or three-dimensional (3D). In some embodiments, the image capture device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image capture device 110 may include a stereo camera. The stereo camera may include a binocular vision device or a multi-camera. In some embodiments, the image capture device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture device 110 may include one or more lenses, a sensor, an exposure-time controller, an amplifier, and an analog to digital (A/D) converter.

The lens may be an optical device that focuses light by means of refraction to form an image. The lens may be configured to intake scenes which it is facing at. It may include aperture mechanisms to adjust the aperture of the lens. An aperture of the lens may refer to the size of the hole through which light passes to reach the sensor. The larger the aperture is, the more light the lens takes in, and thereby the brighter the image captured by the image capture device 110 is. The aperture may be adjustable to adjust the amount of light that passes through the lens. The focal lengths of the one or more lenses may be fixed or may be adjustable to adjust the coverage of the image capture device 110.

The sensor may detect and transform the light taken by the lens into electronic signals. The sensor may include charge coupled device (CCD) and complementary metal-oxide semiconductor (CMOS).

The exposure-time controller may be configured to control an exposure time of the image capture device 110. The exposure time may refer to the length of time when the sensor or film inside the image capture device 110 is exposed to light. In some embodiments, the exposure-time controller may be a shutter device (e.g., a mechanical shutter) configured to open to allow light to reach the sensor through the one or more lenses to make the sensor generate the electrical signals when an image is captured. The shutter device may be controlled manually or automatically. An interval from open to close of the shutter device to take pictures of the scenes may be the exposure time (also referred to as a shutter speed). In some embodiments, the sensor does not generate electrical signals without electricity even though light reaches the sensor. The exposure-time controller may be an electronic shutter to control the length of time when the sensor is charged with electricity (also referred to as the exposure time or the shutter speed). The longer the exposure time is, the more electrical signals the sensor generates, and thereby the brighter the image captured by the image capture device 110 is.

The amplifier may be configured to amplify the electrical signals generated by the sensor. The magnification of the electrical signals generated by the sensor may be referred to as a gain level. The higher the gain level takes, the brighter the image captured by the image capture device 110 is (a side effect of a higher gain level is that the noise is higher as well).

The A/D converter may be configured to transform the amplified electrical signals from the amplifier into digital signals. The digital signals may be transmitted to an image processor (e.g., the processing device 120 or a processor in the image capture device 110) to generate an image.

In some embodiments, the image capture device 110 may communicate with one or more components (e.g., the processing device 120, or the storage device 140) of the image capture device 110 via the network 130. In some embodiments, the image capture device 110 may be directly connected to the one or more components (e.g., the processing device 120, or the storage device 140) of the image capture device 110.

The processing device 120 may process information and/or data to perform one or more functions described in the present disclosure. For example, the processing device 120 may combine two or more images to generate a high-dynamic range (HDR) image.

In some embodiments, the processing device 120 may be a single server or a server group. The server group may be centralized, or distributed (e.g., the processing device 120 may be a distributed system). In some embodiments, the processing device 120 may be local or remote. For example, the processing device 120 may access/transmit information and/or data in/to the image capture device 110, or the storage device 140 via the network 130. As another example, the processing device 120 may be directly connected to the image capture device 110, or the storage device 140 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 having one or more components illustrated in FIG. 2 in the present disclosure.

In some embodiments, the processing device 120 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 120 may be implemented on a mobile device 300 having one or more components illustrated in FIG. 3 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, at least a part of the processing device 120 may be included in the image capture device 110.

The network 130 may be configured to facilitate communications among the components (e.g., the image capture device 110, the processing device 120, and the storage device 140) of the imaging system 100. For example, the network 130 may transmit digital signals from the image capture device 110 to the processing device 120. As another example, the network 130 may transmit images generated by the image capture device 110 to the storage device 140.

In some embodiments, the network 130 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 140 may be configured to store data and/or instructions. In some embodiments, the storage device 140 may store data obtained from the processing device 120 and/or the image capture device 110. For example, the storage device 140 may store images generated by the processing device 120 and/or the image capture device 110. In some embodiments, the storage device 140 may store data and/or instructions that the processing device 120 may execute or use to perform exemplary methods described in the present disclosure. For example, the storage device 140 may store instructions that the processing device 120 may execute to combine two or more images to generate an HDR image. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more components in the imaging system 100 (e.g., the image capture device 110 and the processing device 120). One or more components in the imaging system 100 may access the data or instructions stored in the storage device 140 via the network 130. In some embodiments, the storage device 140 may be directly connected to or communicate with one or more components in the imaging system 100 (e.g., the image capture device 110 and the processing device 120). In some embodiments, the storage device 140 may be part of the image capture device 110 and/or the processing device 120.

In some embodiments, two or more components of the imaging system 100 may be integrated in one device. For example, the image capture device 110, the processing device 120, and the storage device 140 may be integrated in one device (e.g., a camera, a smartphone, a laptop, a workstation, a server, etc.). In some embodiments, one or more components of the imaging system 100 may be located remote from other components. For example, the image capture device 110 may be installed at a location away from the processing device 120, which may be implemented in a single device with the storage device 140.

It should be noted that the component of the imaging system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
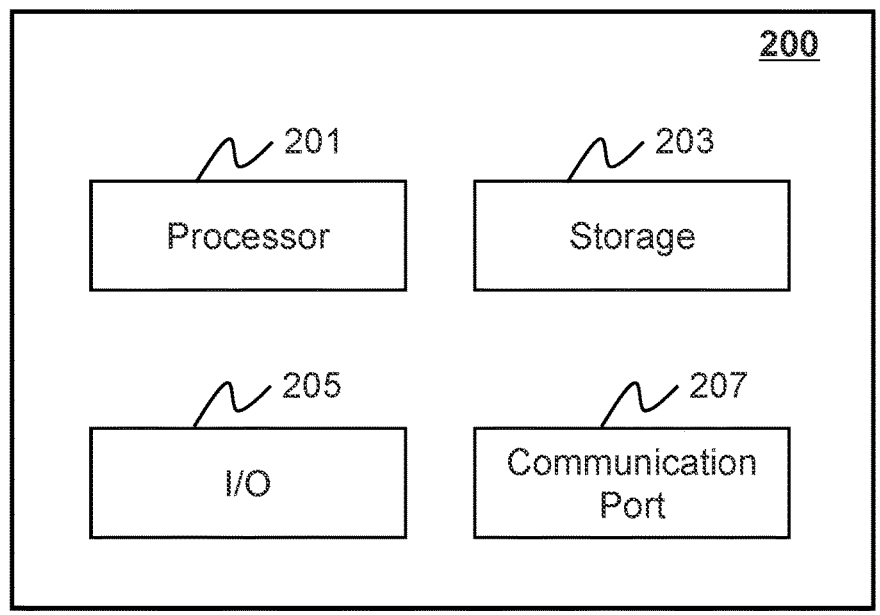
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the image capture device 110 or the processing device 120 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may combine two or more images to generate an HDR image. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for combining two or more images to generate an HDR image. As another example, the storage 203 may store images captured by the image capture device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
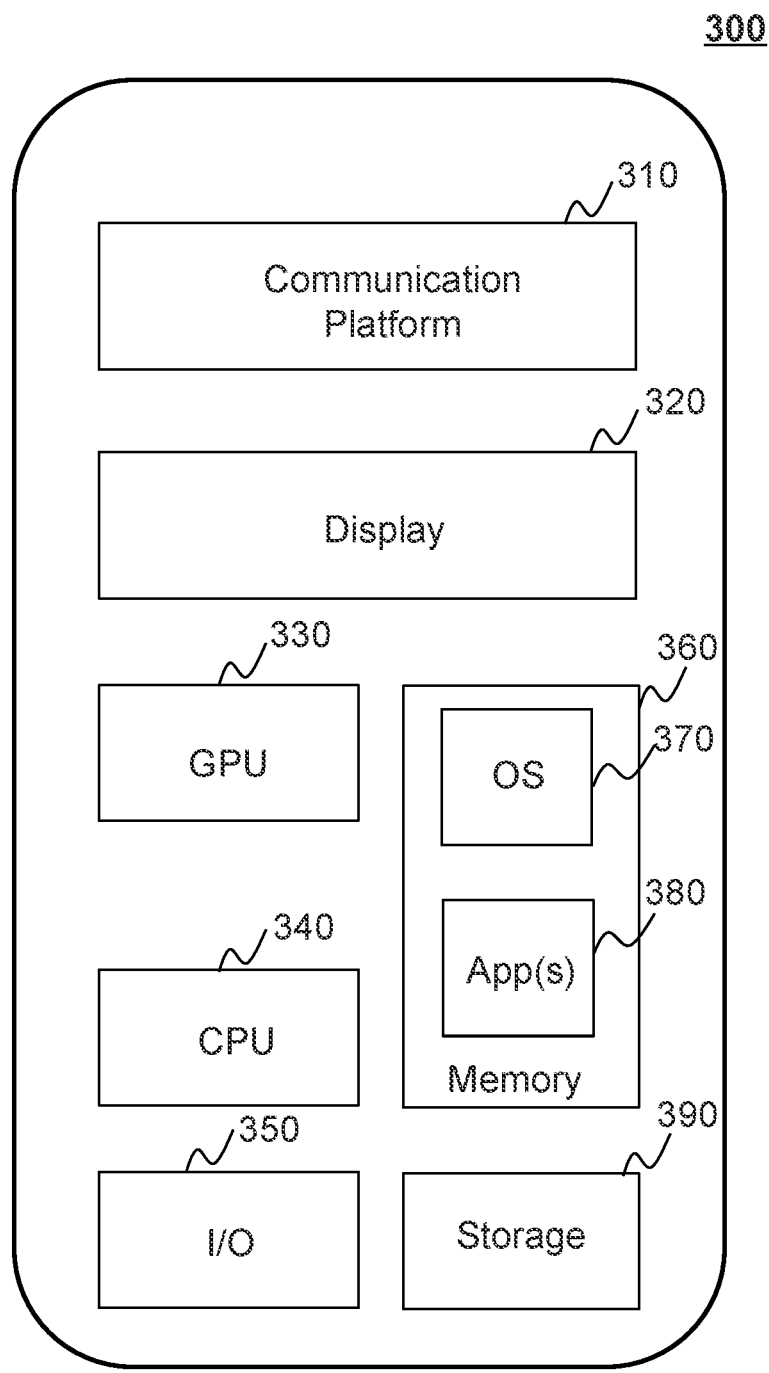
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture device 110 or the processing device 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 120. User interactions with the information stream may be achieved via the I/O 350 and provided to the processing device 120 and/or other components of the speed prediction system 100 via the network 130. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
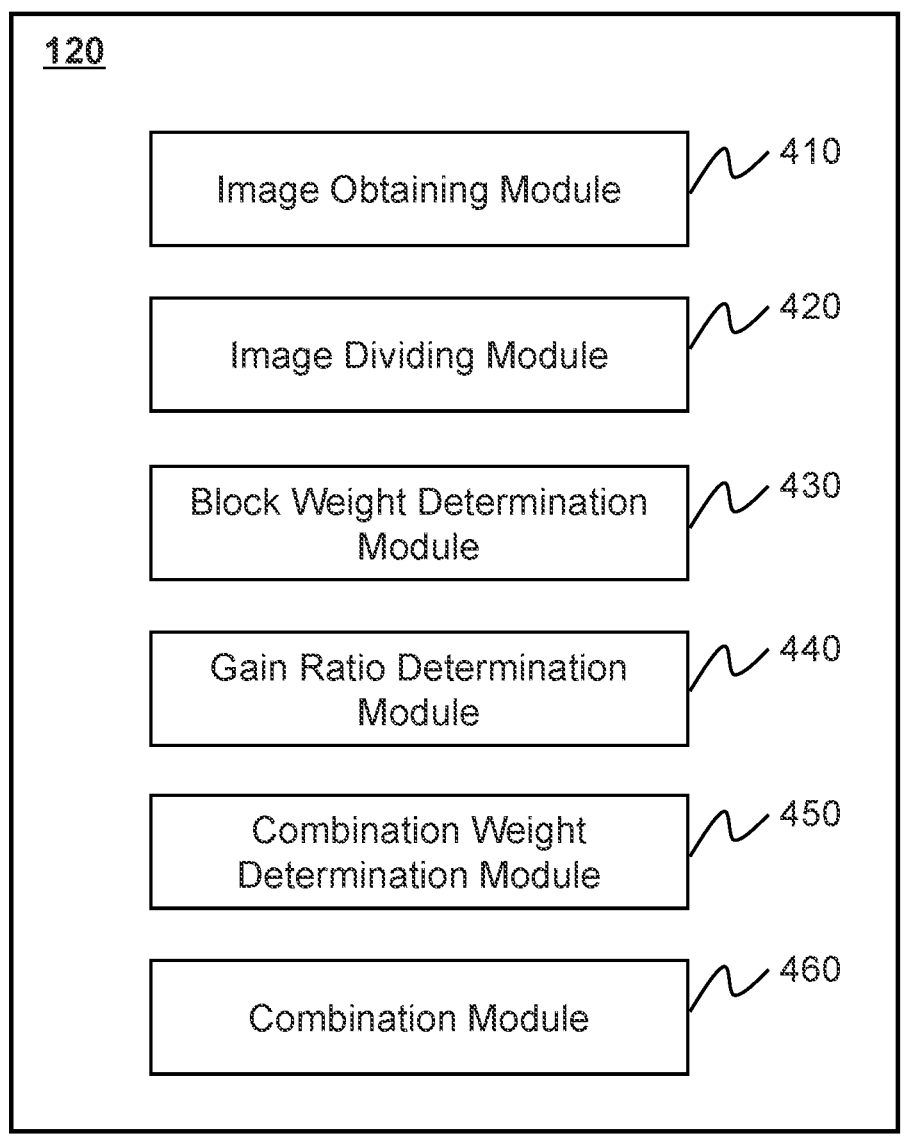
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 120 may include an image obtaining module 410, an image dividing module 420, a block weight determination module 430, a gain ratio determination module 440, a combination weight determination module 450, and a combination module 460.

The image obtaining module 410 may obtain a first image and a second image of a same scene. In some embodiments, the image obtaining module 410 may obtain the first image and the second image from the image capture device 110 and/or a storage medium of the imaging system 100 (e.g., the storage device 140, the storage 203, the memory 360, or the storage 390). In some embodiments, the first image may be captured by an image sensor of the image capture device 110 using a first exposure time. The second image may be captured by the image sensor of the image capture device 110 using a second exposure time that is shorter than the first exposure time. As used herein, the first image may be referred to as a long-exposure image, and the second image may be referred to as a short-exposure image. The first image may present details of the relatively dark region of the scene more clearly than the second image and may include overexposure in the relatively bright region of the scene, while the second image may present details of the relatively bright region of the scene more clearly than the first image and may include underexposure in the relatively dark region of the scene.

The image dividing module 420 may divide the first image into a plurality of first image blocks. In some embodiments, each of the plurality of first image blocks may include one or more pixels of the first image. In some embodiments, the sizes of the plurality of first image blocks may be the same or different. In some embodiments, the shape of the first image block may be any shape, such as rectangle, square, etc. In some embodiments, the shapes of the plurality of first image blocks may be the same or different.

The image dividing module 420 may divide the second image into a plurality of second image blocks. In some embodiments, the way of dividing the second image may be similar to the way of dividing the first image. In some embodiments, each of the plurality of second image blocks may correspond to one of the plurality of first image blocks. In some embodiments, there may be a one-to-one correspondence relation between the plurality of second image blocks and the plurality of first image blocks. The first image block and the corresponding second image block may have the same size, include the same number of pixels, have the same shape, and correspond to the same part of the scene.

The block weight determination module 430 may determine, for each of the plurality of first image blocks, a first block weight of the first image block based on edge information of the first image block and a second block weight of the first image block based on overall information of the first image block.

For brevity, the description of the determination of the first block weight and the second block weight may take one of the plurality of first image blocks as an example. The first block weights and the second block weights of the other first image blocks may be determined in the same way.

The edge information of the first image block may relate to pixel values of pixels in the outermost layer of the pixel array of the first image block. The overall information of the first image block may relate to pixel values and/or luminance values of all pixels in the first image block.

In some embodiments, the block weight determination module 430 may determine at least one edge pixel group of the first image block. The edge pixel group may include a corner pixel of the first image block and pixels of the first image block adjacent to the corner pixel. For each of the at least one edge pixel group, the block weight determination module 430 may determine a sum of pixel values of the pixels in the edge pixel group. The block weight determination module 430 may determine a maximum among the sums of pixel values of the at least one edge pixel group. The block weight determination module 430 may determine the first block weight based on the maximum and one or more center pixels of the first image block.

In some embodiments, the block weight determination module 430 may determine the second block weight of the first image block by determining a weighted average of pixel values of pixels in the first image block. In some embodiments, the weight for each pixel in the first image block may relate to the luminance value of the pixel. For example, the weight of a pixel in the first image block may be a ratio of the luminance value of the pixel to a sum of luminance values of all pixels in the first image block.

The block weight determination module 430 may determine, for each of the plurality of second image blocks, a third block weight of the second image block based on overall information of the second image block.

For brevity, the description of the determination of the third block weight may take one of the plurality of second image blocks as an example. The third block weights of the other second image blocks may be determined in the same way.

The overall information of the second image block may relate to pixel values and/or luminance values of all pixels in the first image block.

In some embodiments, the block weight determination module 430 may determine the third block weight by determining a weighted average of pixel values of pixels in the second image block. In some embodiments, the weight for each pixel in the second image block may relate to the luminance value of the pixel. For example, the weight of a pixel in the second image block may be a ratio of the luminance value of the pixel to a sum of luminance values of all pixels in the second image block.

The gain ration determination module 440 may determine an exposure gain ratio based on the second block weights of the plurality of first image blocks and the third block weights of the plurality of second image blocks. The exposure gain ratio may be configured to transform pixels values of images that are captured using different exposure times to the same exposure level, which may lead to a more accurate combined image during the subsequent image combination process. Details regarding the determination of the exposure gain ratio may be found elsewhere in the present disclosure (e.g., the description in connection with FIG. 7).

The combination weight determination module 450 may determine a first combination weight for each of the plurality of first image blocks and a second combination weight for the corresponding second image block based on the first block weight of the first image block, the third block weight of the corresponding second image block, and the exposure gain ratio. In some embodiments, a sum of the first combination weight of the first image block and the second combination weight of the corresponding second image block may be a fixed value (e.g., 1).

For brevity, the description of the determination of the first combination weight and the second combination weight in the process 500 may take one of the plurality of first image blocks and the corresponding second image block as an example. The first combination weights of the other first image blocks and the second combination weights of the other second image blocks may be determined in the same way.

In some embodiments, the combination weight determination module 450 may determine a first mapping weight by performing a first mapping operation based on the first block weight of the first image block. In some embodiments, the combination weight determination module 450 may determine a second mapping weight by performing a second mapping operation based on the third block weight of the corresponding second image block and the exposure gain ratio. In some embodiments, the combination weight determination module 450 may determine a product of the first mapping weight and the second mapping weight as the second combination weight. The combination weight determination module 450 may determine a difference between the fixed value and the second combination weight as the first combination weight.

The combination module 460 may generate a third image by combining the first image and the second image based on the first combination weights of the plurality of first image blocks and the second combination weights of the plurality of second image blocks. In some embodiments, the combination module 460 may generate the third image using bilinear interpolation based on the first combination weights of the plurality of first image blocks and the second combination weights of the plurality of second image blocks.

In some embodiments, after generating the third image, the combination module 460 may output the third image. For example, during a process for capturing a video, the combination module 460 may output the third image as a frame of the video.

In some embodiments, the gain ratio determination module 440 may further determine whether the determined exposure gain ratio is needed to be modified. In response to a determination that the determined exposure gain ratio is needed to be modified, the gain ratio determination module 440 may modify the determined exposure gain ratio. In response to a determination that the determined exposure gain ratio is not needed to be modified, the gain ratio determination module 440 may keep the determined exposure gain ratio. Details regarding the determination of whether to modify the determined exposure gain ratio may be found elsewhere in the present disclosure (e.g., the description in connection with at least one of FIGS. 8-9).

In some embodiments, the combination weight determination module 450 may determine whether the determined first and second combination weights are needed to be modified. In response to a determination that the determined first and second combination weights are needed to be modified, the combination weight determination module 450 may modify the determined first and second combination weights. In response to a determination that the determined first and second combination weights are not needed to be modified, the combination weight determination module 450 may keep the determined first and second combination weights. Details regarding the determination of whether to modify the determined first and second combination weights may be found elsewhere in the present disclosure (e.g., the description in connection with FIG. 11).

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the image dividing module 420 and the block weight determination module 430 may be combined into a single module which may divide the first image and the second image into a plurality of image blocks, and determine a block weight for each image block. As another example, the combination weight determination module 450 may be divided into two units. A first unit may determine the first combination weight. A second unit may determine the second combination weight.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of the processing device 120. As another example, each of components of the processing device 120 may correspond to a storage module, respectively. Additionally or alternatively, the components of the processing device 120 may share a common storage module.

Figure 5:
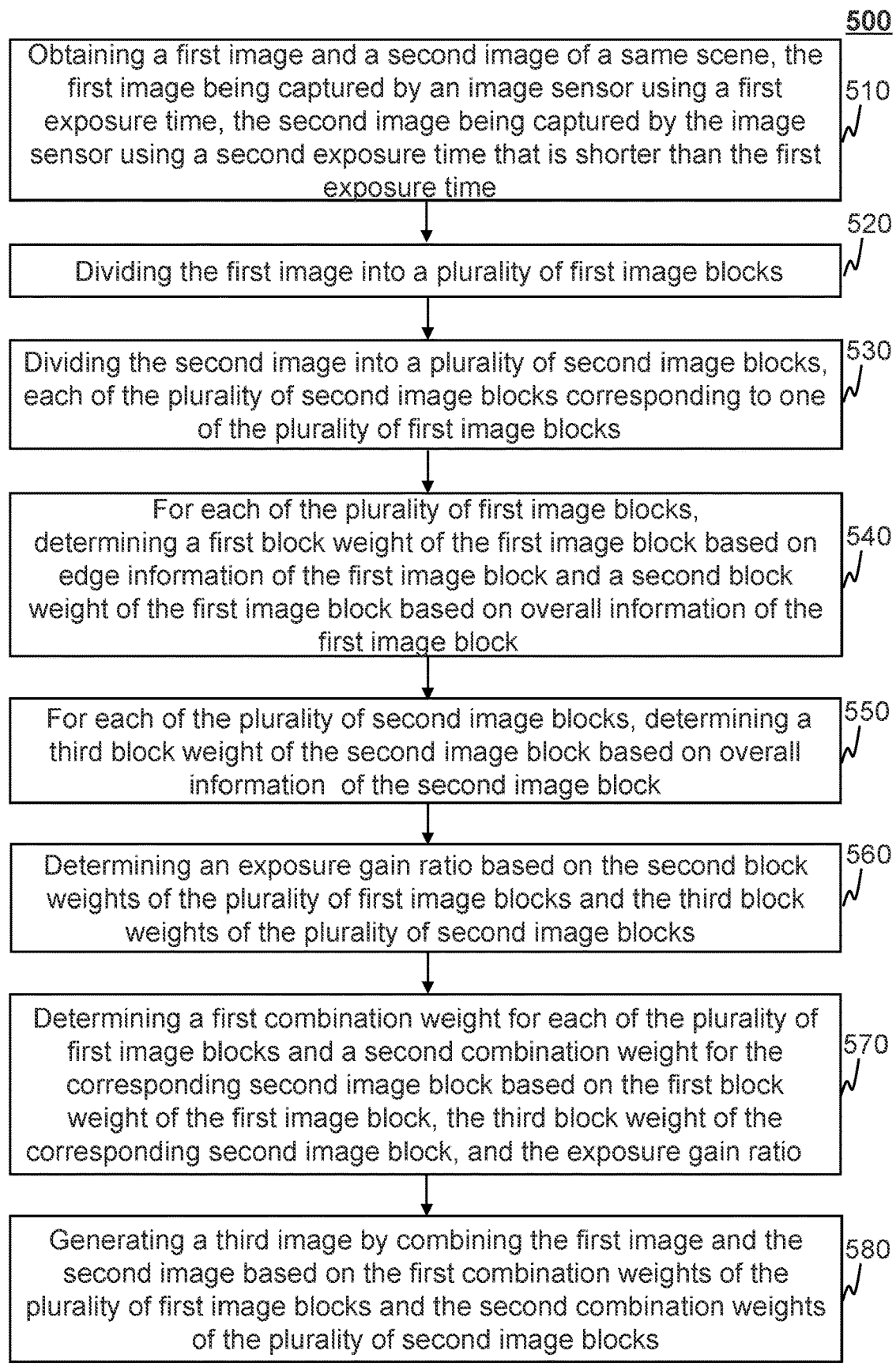
FIG. 5 is a flowchart illustrating an exemplary process for image combination according to some embodiments of the present disclosure.

FIG. 5 is a flowchart illustrating an exemplary process for image combination according to some embodiments of the present disclosure. In some embodiments, the process 500 may be implemented in the imaging system 100 illustrated in FIG. 1. For example, the process 500 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the process 500 may be used to generate a single combined image. In some embodiments, the processing device 120 may generate a sequence of frames in a video by repeating the process 500.

For brevity, the description of the methods and/or systems for image combination in the present disclosure may take HDR imaging as an example. It should be noted that the methods and/or systems for image combination described below are merely some examples or implementations. For persons having ordinary skills in the art, the methods and/or systems for image combination in the present disclosure may be applied to other similar situations using image combination.

For brevity, the description of the methods and/or systems for image combination in the present disclosure may take the combination of two images as an example. It should be noted that the methods and/or systems for image combination described below are merely some examples or implementations. For persons having ordinary skills in the art, the methods and/or systems for image combination in the present disclosure may be applied to other situations, such as the combination of more than two images.

In 510, the processing device 120 (e.g., the image obtaining module 410) may obtain a first image and a second image of a same scene. In some embodiments, the processing device 120 may obtain the first image and the second image from the image capture device 110 and/or a storage medium of the imaging system 100 (e.g., the storage device 140, the storage 203, the memory 360, or the storage 390). In some embodiments, the first image may be captured by an image sensor of the image capture device 110 using a first exposure time. The second image may be captured by the image sensor of the image capture device 110 using a second exposure time that is shorter than the first exposure time. As used herein, the first image may be referred to as a long-exposure image, and the second image may be referred to as a short-exposure image. The first image may present details of the relatively dark region of the scene more clearly than the second image and may include overexposure in the relatively bright region of the scene, while the second image may present details of the relatively bright region of the scene more clearly than the first image and may include underexposure in the relatively dark region of the scene.

In 520, the processing device 120 (e.g., the image dividing module 420) may divide the first image into a plurality of first image blocks. In some embodiments, each of the plurality of first image blocks may include one or more pixels of the first image. In some embodiments, the sizes of the plurality of first image blocks may be the same or different. In some embodiments, the shape of the first image block may be any shape, such as rectangle, square, etc. In some embodiments, the shapes of the plurality of first image blocks may be the same or different.

In 530, the processing device 120 (e.g., the image dividing module 420) may divide the second image into a plurality of second image blocks. In some embodiments, the way of dividing the second image may be similar to the way of dividing the first image. In some embodiments, each of the plurality of second image blocks may correspond to one of the plurality of first image blocks. In some embodiments, there may be a one-to-one correspondence relation between the plurality of second image blocks and the plurality of first image blocks. The first image block and the corresponding second image block may have the same size, include the same number of pixels, have the same shape, and correspond to the same part of the scene.

In some embodiments, the processing device 120 may perform operations 520-530 in any order. For example, the processing device 120 may perform operation 520 before, after, or simultaneously with operation 530.

In 540, the processing device 120 (e.g., the block weight determination module 430) may determine, for each of the plurality of first image blocks, a first block weight of the first image block based on edge information of the first image block and a second block weight of the first image block based on overall information of the first image block.

For brevity, the description of the determination of the first block weight and the second block weight may take one of the plurality of first image blocks as an example. The first block weights and the second block weights of the other first image blocks may be determined in the same way.

The edge information of the first image block may relate to pixel values of pixels in the outermost layer of the pixel array of the first image block. The overall information of the first image block may relate to pixel values and/or luminance values of all pixels in the first image block.

In some embodiments, the processing device 120 may determine at least one edge pixel group of the first image block. The edge pixel group may include a corner pixel of the first image block and one or more pixels in the outermost layer of the pixel array of the first image block.

For example, if the number (or count) of rows and the number (or count) of columns are both odd numbers, the corner pixel may be the pixel located at the central location of the first image block. As another example, the first image block may be obtained by determining a target pixel and performing extension from the target pixel. If at least one of the number (or count) of rows and the number (or count) of columns is an even number, the corner pixel may be the target pixel used to determine the first image block.

Merely by way of example, for a rectangle first image block, the outermost layer of the pixel array of the first image block may include four sides and four corners pixels. The edge pixel group may include a corner pixel and at least two adjacent pixels. In each of the two sides of the outermost layer adjacent to the corner pixel, at least one pixel closest to the corner pixel may be selected as the adjacent pixel corresponding to the corner pixel. For example, in each of the two sides of the outermost layer adjacent to the corner pixel, m−2 pixel(s) closest to the corner pixel (e.g., the pixel(s) other than two corner pixels) may be selected as the adjacent pixel corresponding to the corner pixel, wherein m refers to a count of pixels in the each of the two sides of the outermost layer adjacent to the corner pixel.

For each of the at least one edge pixel group, the processing device 120 may determine a sum of pixel values of the pixels in the edge pixel group. The processing device 120 may determine a maximum among the sums of pixel values of the at least one edge pixel group. The processing device 120 may determine the first block weight based on the maximum and one or more center pixels of the first image block.

Taking a rectangle first image block as an example, FIG. 6A is a schematic diagram illustrating an example of a first image block 610 according to some embodiments of the present disclosure. As shown in FIG. 6A, the first image block 610 has the size of 3*3 pixels. The first image blocks 610 includes 9 pixels of which the sequence numbers are 0-8, respectively. Pixels "0," "2," "6," and "8" are corner pixels of the first image block 610. Pixel "4" is the center pixel of the first image block 610. The first image block 610 may include four edge pixel groups, such as the edge pixel group including the corner pixel "0" and the adjacent pixels "1" and "3," the edge pixel group including the corner pixel "2" and the adjacent pixels "1" and "5," the edge pixel group including the corner pixel "6" and the adjacent pixels "3" and "7," and the edge pixel group including the corner pixel "8" and the adjacent pixels "7" and "5".

Merely by way example, the processing device 120 may determine the first block weight based on Equation (1) below:

$$P1\_max = (Lsum\_max + Lc)/n \qquad (1),$$

wherein P1_max refers to the first block weight; Lsum_max refers to the maximum among the sums of pixel values of the at least one edge pixel group; Lc refers to a pixel value of the center pixel; and n refers to a total count of pixels in the edge pixel group and the center pixel.

For example, when the processing device 120 determine the first block weight for the first image block 610 in FIG. 6A using Equation (1), Lc may be the pixel value of the center pixel "4" and n may be equal to 4.

Taking the determination of the first block weight for the first image block 610 in FIG. 6A using Equation (1) as an example, the processing device 120 may determine four edge pixel groups of the first image block 610 and determine, based on Equations (2)-(5) below, the sum of pixels for each of the four edge pixel groups:

$$Lsum0 = L0 + L1 + L3, \qquad (2)$$

$$Lsum1 = L1 + L2 + L5, \qquad (3)$$

$$Lsum2 = L3 + L6 + L7, \qquad (4)$$

and $$Lsum3 = L5 + L7 + L8, \qquad (5)$$

where Lsum0, Lsum1, Lsum2, and Lsum3 refer to the sum of pixels for each of the four edge pixel groups of the first image block 610; Lt refers to the pixel value of a pixel in the first image block 610 of which the sequence number is t (t=0, 1, . . . , 8).

The processing device 120 may determine the maximum among the sums of pixel values of the four edge pixel groups based on Equation (6) below:

$$Lsum\_max = \max(Lsum0, Lsum1, Lsum2, Lsum3) \qquad (6).$$

The processing device 120 may determine the first block weight of the first image block 610 based on Equation (7) below:

$$P1\_max = (Lsum\_max + L4)/4. \tag{7}$$

In some embodiments, the processing device 120 may determine the second block weight of the first image block by determining a weighted average of pixel values of pixels in the first image block. In some embodiments, the weight for each pixel in the first image block may relate to the luminance value of the pixel. For example, the weight of a pixel in the first image block may be a ratio of the luminance value of the pixel to a sum of luminance values of all pixels in the first image block. In some embodiments, the weight for each pixel in the first image block may be determined using Gaussian filter window weights.

In 550, the processing device 120 (e.g., the block weight determination module 430) may determine, for each of the plurality of second image blocks, a third block weight of the second image block based on overall information of the second image block.

For brevity, the description of the determination of the third block weight may take one of the plurality of second image blocks as an example. The third block weights of the other second image blocks may be determined in the same way.

The overall information of the second image block may relate to pixel values and/or luminance values of all pixels in the first image block.

In some embodiments, the processing device 120 may determine the third block weight by determining a weighted average of pixel values of pixels in the second image block. In some embodiments, the weight for each pixel in the second image block may relate to the luminance value of the pixel. For example, the weight of a pixel in the second image block may be a ratio of the luminance value of the pixel to a sum of luminance values of all pixels in the second image block.

In some embodiments, the processing device 120 may perform operations 540-550 in any order. For example, the processing device 120 may perform operation 540 before, after, or simultaneously with operation 550.

In 560, the processing device 120 (e.g., the gain ration determination module 440) may determine an exposure gain ratio based on the second block weights of the plurality of first image blocks and the third block weights of the plurality of second image blocks. The exposure gain ratio may be configured to transform pixels values of images that are captured using different exposure times to the same exposure level, which may lead to a more accurate combined image during the subsequent image combination process. Details regarding the determination of the exposure gain ratio may be found elsewhere in the present disclosure (e.g., the description in connection with FIG. 7).

In 570, the processing device 120 (e.g., the combination weight determination module 450) may determine a first combination weight for each of the plurality of first image blocks and a second combination weight for the corresponding second image block based on the first block weight of the first image block, the third block weight of the corresponding second image block, and the exposure gain ratio. In some embodiments, a sum of the first combination weight of the first image block and the second combination weight of the corresponding second image block may be a fixed value (e.g., 1).

For brevity, the description of the determination of the first combination weight and the second combination weight in the process 500 may take one of the plurality of first image blocks and the corresponding second image block as an example. The first combination weights of the other first image blocks and the second combination weights of the other second image blocks may be determined in the same way.

In some embodiments, the processing device 120 may determine a first mapping weight by performing a first mapping operation based on the first block weight of the first image block.

For example, FIG. 6D is a schematic diagram illustrating an example of a mapping curve 640 between the first mapping weight and the first block weight according to some embodiments of the present disclosure. As shown in FIG. 6D, the horizontal axis of the mapping curve 640 represents the first block weight and the vertical axis of the mapping curve 640 represents the first mapping weight. Thr_long (also referred to as Thr_1) refers to a threshold relating to the first block weight (also referred to as a fifth threshold). k_long (also referred to as k_1) refers to the slope of the mapping curve 640.

In some embodiments, according to the mapping curve 640, the processing device 120 may determine the first mapping weight using Equation (8) below:

$$W1 = (P1\_max - thr\_1) \times k\_1 \tag{8},$$

wherein W1 refers to the first mapping weight.

In some embodiments, the processing device 120 may determine a second mapping weight by performing a second mapping operation based on the third block weight of the corresponding second image block and the exposure gain ratio.

For example, FIG. 6E is a schematic diagram illustrating an example of a mapping curve 650 between the second mapping weight and the third block weight according to some embodiments of the present disclosure. As shown in FIG. 6E, the horizontal axis of the mapping curve 650 represents the third block weight and the vertical axis of the mapping curve 650 represents the second mapping weight. Thr_short (also referred to as Thr_2) refers to a threshold relating to the third block weight (also referred to as a sixth threshold). k_short (also referred to as k_2) refers to the slope of the mapping curve 650. In some embodiments, k_1 and k_2 may be the same or different.

In some embodiments, according to the mapping curve 650, the processing device 120 may determine the second mapping weight using Equation (9) below:

$$W2 = (P3 \times gain\_a - thr\_2) \times k\_2 \tag{9},$$

wherein W2 refers to the second mapping weight; P3 refers to the third block weight of the corresponding second image block; and gain_a refers to the exposure gain ratio.

In some embodiments, the processing device 120 may determine a product of the first mapping weight and the second mapping weight as the second combination weight. For example, the processing device 120 may determine the second combination weight based on Equation (10) below:

$$sw\_final\_2 = W1 * W2, \tag{10}$$

where sw_final_2 refers to the second combination weight.

The processing device 120 may determine a difference between the fixed value and the second combination weight as the first combination weight. For example, the processing device 120 may determine the first combination weight based on Equation (11) below:

$$sw\_final\_1 = V_f - sw\_final\_2, \tag{11}$$

where sw_final_1 refers to the first combination weight; and $V_f$ refers to the fixed value. For example, during the process for determining the first combination weight and the second combination weight by performing the mapping operation, the determined first and second combination weights may be normalized. The sum of the normalized first and second combination weights may be equal to 1. In this case, sw_final_1 may be equal to 1−sw_final_2.

In 580, the processing device 120 (e.g., the combination module 460) may generate a third image by combining the first image and the second image based on the first combination weights of the plurality of first image blocks and the second combination weights of the plurality of second image blocks. In some embodiments, the processing device 120 may generate the third image using bilinear interpolation based on the first combination weights of the plurality of first image blocks and the second combination weights of the plurality of second image blocks.

For example, the processing device 120 may generate the third image based on Equation (12) below:

$$\text{Newdata} = \sum_{i=1}^{m} [(data\_2_i \times gain\_a) \times sw\_final\_2_p + data\_1_i \times sw\_final\_1_p] \tag{12},$$

wherein Newdata refers to pixel values of pixels in the third image; m refers to a count of the pixels in the third image, and m is an positive integer larger than 1; $data\_1_i$ refers to a pixel value of a pixel i in the first image block p of the first image; $data\_2_i$ refers to a pixel value of the pixel in the second image corresponding to the pixel i in the first image; gain_a refers to the exposure gain ratio; $sw\_final\_1_p$ refers to the first combination weight of the first image block p; $sw\_final\_2_p$ refers to the second combination weight of the second image block corresponding to the first image block p; and a sum of $sw\_final\_1_p$ and $sw\_final\_2_p$ is equal to the fixed value.

In some embodiments, after generating the third image, the processing device 120 (e.g., the combination module 460) may output the third image. For example, during a process for capturing a video, the processing device 120 may output the third image as a frame of the video.

In some embodiments, after operation 560, the processing device 120 may determine whether the exposure gain ratio determined in operation 560 is needed to be modified. In response to a determination that the exposure gain ratio determined in operation 560 is needed to be modified, the processing device 120 may modify the exposure gain ratio determined in operation 560. The processing device 120 may perform operation 570 based on the modified exposure gain ratio. In response to a determination that the exposure gain ratio determined in operation 560 is not needed to be modified, the processing device 120 may keep the exposure gain ratio determined in operation 560. The processing device 120 may perform operation 570 based on the exposure gain ratio determined in operation 560. Details regarding the determination of whether to modify the exposure gain ratio determined in operation 560 may be found elsewhere in the present disclosure (e.g., the description in connection with at least one of FIGS. 8-9).

In some embodiments, after operation 570, the processing device 120 may determine whether the first and second combination weights determined in operation 570 are needed to be modified. In response to a determination that the first and second combination weights determined in operation 570 are needed to be modified, the processing device 120 may modify the first and second combination weights determined in operation 570. The processing device 120 may perform operation 580 based on the modified first and second combination weights. In response to a determination that the first and second combination weights determined in operation 570 are not needed to be modified, the processing device 120 may keep the first and second combination weights determined in operation 570. The processing device 120 may perform operation 580 based on the first and second combination weights determined in operation 570. Details regarding the determination of whether to modify the first and second combination weights determined in operation 570 may be found elsewhere in the present disclosure (e.g., the description in connection with FIG. 11).

In some embodiments, the processing device 120 may determine the first combination weight and the second combination weight based on the overall information of the first image and the second image, without considering the edge information of the plurality of first image blocks of the first image. Details may be found elsewhere in the present disclosure (e.g., the description in connection with FIG. 12).

In the present disclosure, the process for image combination by considering the edge information of the image blocks may reduce the problems in the combination of edges of the image blocks.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 7 is a flowchart illustrating an exemplary process for determining an exposure gain ratio according to some embodiments of the present disclosure. In some embodiments, the process 700 may be implemented in the imaging system 100 illustrated in FIG. 1. For example, the process 700 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, the processing device 120 may perform operation 560 of the process 500 in FIG. 5 based on the process 700.

In 710, the processing device 120 (e.g., the gain ratio determination module 440) may determine a first count, a second count, a first statistic, a second statistic, a third statistic, and a fourth statistic based on the second block weights of the plurality of first image blocks and the third block weights of the plurality of second image blocks by traversing the first image and the second image.

In some embodiments, the processing device 120 may determine the first count by determining a count of second block weights that are larger than a first threshold and less than a second threshold. The processing device 120 may determine the second count by determining a count of second block weights that are larger than or equal to the second threshold and less than or equal to a third threshold. The processing device 120 may determine the first statistic by determining a sum of second block weights that are larger than the first threshold and less than the second threshold. The processing device 120 may determine the second statistic by determining a sum of third block weights corresponding to the second block weights that are larger than the first threshold and less than the second threshold. The processing device 120 may determine the third statistic by determining a sum of second block weights that are larger than or equal to the second threshold and less than or equal to the third threshold. The processing device 120 may determine the fourth statistic by determining a sum of third block weights corresponding to the second block weights that are larger than or equal to the second threshold and less than or equal to the third threshold.

For example, the processing device 120 may determine the first count, the second count, the first statistic, the second statistic, the third statistic, and the fourth statistic based on the following operations: (1) the processing device 120 may set the first count, the second count, the first statistic, the second statistic, the third statistic, and the fourth statistic as 0; (2) the processing device 120 may select one of the plurality of first image blocks; (3) the processing device 120 may compare the second block weight of the selected first image block to the first threshold, the second threshold, and the third threshold, respectively; (4) in response to a determination that the second block weight is larger than the first threshold and less the second threshold, the processing device 120 may add 1 to the current value of the first count, add the second block weight of the selected first image block to the current value of the first statistic, and add the third block weight of the second image block corresponding to the selected first image block to the current value of the second statistic; (5) in response to a determination that the second block weight is larger than or equal to the second threshold and less than the third threshold, the processing device 120 may add 1 to the current value of the second count, add the second block weight of the selected first image block to the current value of the third statistic, and add the third block weight of the second image block corresponding to the selected first image block to the current value of the fourth statistic; (6) the processing device 120 may determine whether the traversing operation is finished, for example, whether there is any first image block that is not processed by operations (2)-(5); (7) in response to a determination that the traversing operation is finished, the processing device 120 may output the first count, the second count, the first statistic, the second statistic, the third statistic, and the fourth statistic; (8) in response to a determination that the traversing operation is not finished, the processing device 120 may repeat operations (2)-(6).

In 720, the processing device 120 (e.g., the gain ratio determination module 440) may determine the exposure gain ratio based on the first count, the second count, the first statistic, the second statistic, the third statistic, and the fourth statistic.

In some embodiments, the processing device 120 may determine the exposure gain ratio by performing a linear fitting operation based on the first count, the second count, the first statistic, the second statistic, the third statistic, and the fourth statistic. For example, the processing device 120 may determine the exposure gain ratio based on Equation (13) below:

$$\text{gain\_}a = \frac{\frac{y2}{n2} - \frac{y1}{n1}}{\frac{x2}{n2} - \frac{x1}{n1}} = \frac{y2^*n1 - y1^*n2}{x2^*n1 - x1^*n2}, \tag{13}$$

wherein gain_a refers to the exposure gain ratio; n1 refers to the first count; n2 refers to the second count; y1 refers to the first statistic; x1 refers to the second statistic; y2 refers to the third statistic; and x2 refers to the fourth statistic.

In some embodiments, the processing device 120 may determine the exposure gain ratio with one or more digits after the decimal point so that modification may be performed to the determined exposure gain ratio.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 8 is a flowchart illustrating an exemplary process for modifying a determined exposure gain ratio according to some embodiments of the present disclosure. In some embodiments, the process 800 may be implemented in the imaging system 100 illustrated in FIG. 1. For example, the process 800 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the processing device 120 may perform the process 800 after operation 560 of the process 500 in FIG. 5 and/or the process 700 in FIG. 7 to modify the determined exposure gain ratio.

In 810, the processing device 120 (e.g., the gain ratio determination module 440) may determine a reference gain ratio based on the first statistic, the second statistic, the third statistic, and the fourth statistic. The determined exposure gain ratio may be inconsistent with the actual situation relating to the first image and the second image. The reference gain ratio may be configured to be a reference to modify the determined exposure gain ratio to make the determined exposure gain ratio more consistent with the actual situation, which may reduce the problems of the image combination. Details regarding the determination of the reference gain ratio may be found elsewhere in the present disclosure (e.g., the description in connection with FIG. 9).

In 820, the processing device 120 (e.g., the gain ratio determination module 440) may modify the exposure gain ratio based on the reference gain ratio. In some embodiments, the processing device 120 may use an algorithm relating to successive frames and/or adaptive adjustment to modify the determined exposure gain ratio so that the determined exposure gain ratio is as close as possible to the reference gain ratio. Details regarding the modification of the determined exposure gain ratio may be found elsewhere in the present disclosure (e.g., the description in connection with FIG. 10).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
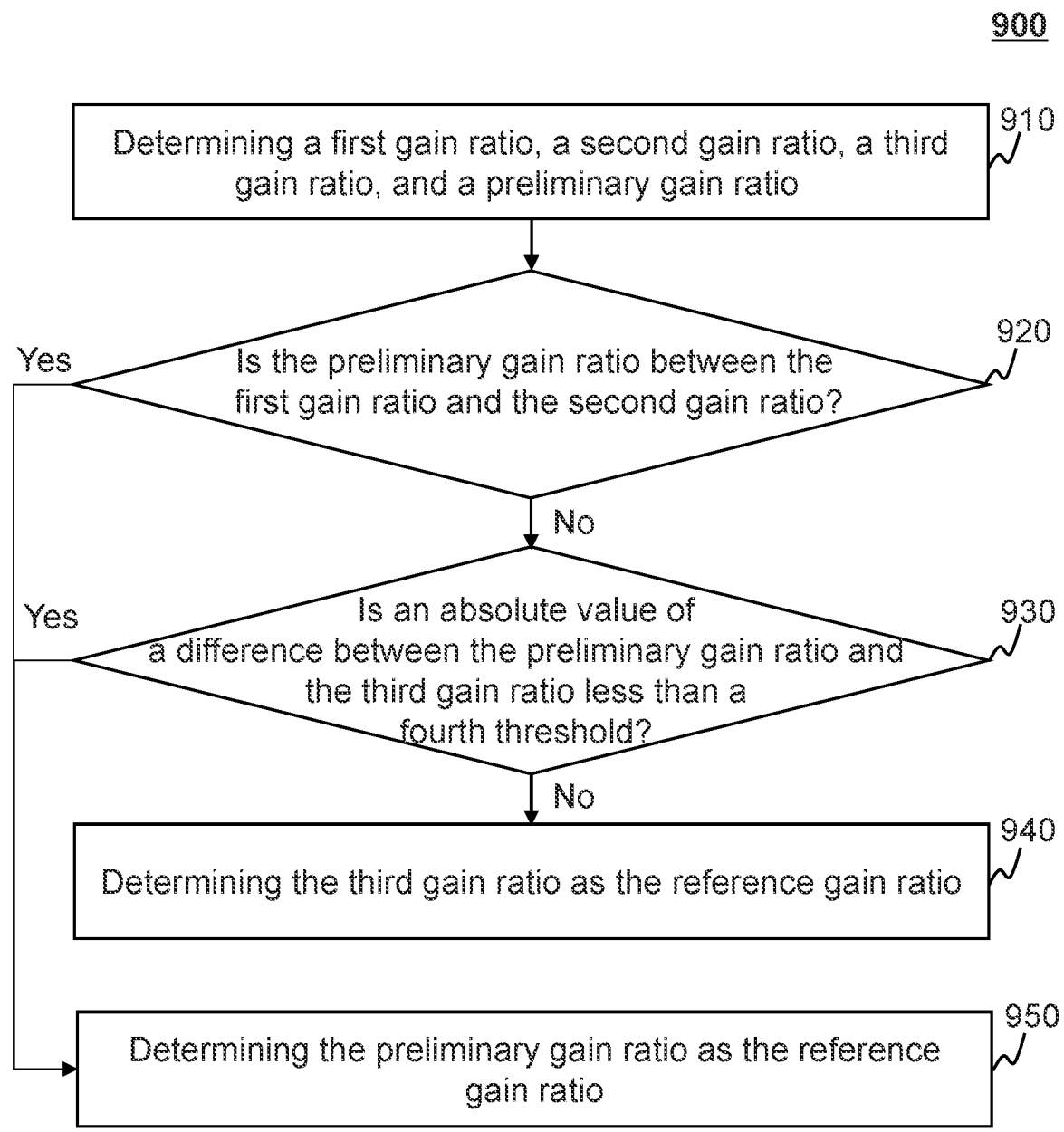
FIG. 9 is a flowchart illustrating an exemplary process for determining a reference gain ratio according to some embodiments of the present disclosure.

FIG. 9 is a flowchart illustrating an exemplary process for determining a reference gain ratio according to some embodiments of the present disclosure. In some embodiments, the process 900 may be implemented in the imaging system 100 illustrated in FIG. 1. For example, the process 900 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, the processing device 120 may perform operation 810 of the process 800 in FIG. 8 based on the process 900.

In 910, the processing device 120 (e.g., the gain ratio determination module 440) may determine a first gain ratio, a second gain ratio, a third gain ratio, and a preliminary gain ratio.

The processing device 120 may determine the first gain ratio by determining a ratio of the first statistic to the second statistic. For example, the processing device 120 may determine the first gain ratio based on Equation (14) below:

$$ratio0 = y1/x1 \quad (14),$$

wherein ratio0 refers to the first gain ratio.

The processing device 120 may determine the second gain ratio by determining a ratio of the third statistic to the fourth statistic. For example, the processing device 120 may determine the second gain ratio based on Equation (15) below:

$$ratio1 = y2/x2, \quad (15)$$

wherein ratio1 refers to the second gain ratio.

The processing device 120 may determine the third gain ratio by determining an average of the first gain ratio and the second gain ratio. For example, the processing device 120 may determine the third gain ratio based on Equation (16) below:

$$ratio\_a = (ratio0 + ratio1)/2, \quad (16)$$

wherein ratio_a refers to the third gain ratio.

The preliminary gain ratio may relate to the exposure mechanism of the image capture device 110. Further, the processing device 120 may determine the preliminary gain ratio based on the first exposure time and the second exposure time. Further, the processing device 120 may determine first image luminance of the first image based on the first exposure time and a mapping relation of the image capture device 110 between the exposure time and image luminance. The processing device 120 may determine second image luminance of the second image based on the second exposure time and the mapping relation between the exposure time and the image luminance. The processing device 120 may determine a ratio of the first image luminance to the second image luminance as the preliminary gain ratio.

In some embodiments, the processing device 120 may perform operations 920-950 to compare the first gain ratio, the second gain ratio, the third gain ratio, and the preliminary gain ratio, and select one of the first gain ratio, the second gain ratio, the third gain ratio, and the preliminary gain ratio as the reference gain ratio based on the comparison.

In 920, the processing device 120 (e.g., the gain ratio determination module 440) may determine whether the preliminary gain ratio is between the first gain ratio and the second gain ratio. For example, the processing device 120 may determine whether the preliminary gain ratio is between the first gain ratio and the second gain ratio by determining whether Expression (17) below is satisfied:

$$reg\_a < \min(ratio0, ratio1) \| reg\_a > \max(ratio0, ratio1) \quad (17),$$

wherein reg_a refers to the preliminary gain ratio. In response to a determination that Expression (17) is satisfied, the processing device 120 may determine that the preliminary gain ratio is between the first gain ratio and the second gain ratio. In response to a determination that Expression (17) is not satisfied, the processing device 120 may determine that the preliminary gain ratio is outside a range between the first gain ratio and the second gain ratio.

It should be noted that Expression (17) is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 120 may determine whether the preliminary gain ratio is between the first gain ratio and the second gain ratio by determining whether other expressions that have the same meaning with Expression (17) are satisfied, such as Expression (18) below:

$$reg\_a \in [ratio0, ratio1] \quad (18).$$

In response to a determination that the preliminary gain ration is between the first gain ratio and the second gain ratio, the process 900 may proceed to operation 950 in which the processing device 120 may determine the preliminary gain ratio as the reference gain ratio. In response to a determination that the preliminary gain ration is outside the range between the first gain ratio and the second gain ratio, the process 900 may proceed to operation 930 in which the processing device 120 may determine whether an absolute value of a difference between the preliminary gain ratio and the third gain ratio is less than a fourth threshold. In response to a determination that the absolute value of the difference between the preliminary gain ratio and the third gain ratio is less than the fourth threshold, the process 900 may proceed to operation 950 in which the processing device 120 may determine the preliminary gain ratio as the reference gain ratio. In response to a determination that the absolute value of the difference between the preliminary gain ratio and the third gain ratio is larger than or equal to the fourth threshold, the process 900 may proceed to operation 940 in which the processing device 120 may determine the third gain ratio as the reference gain ratio.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
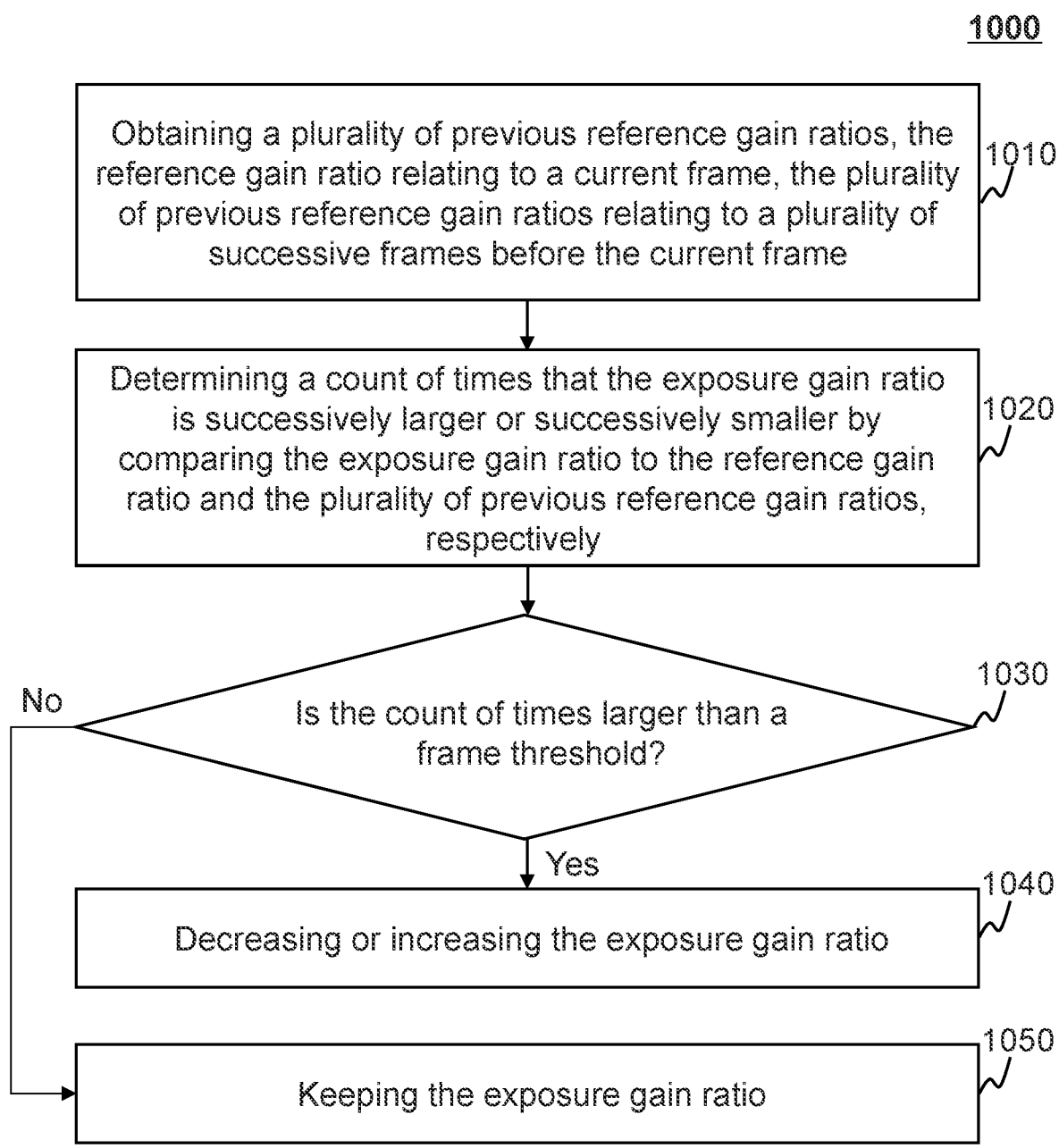
FIG. 10 is a flowchart illustrating an exemplary process for modifying a determined exposure gain ratio according to some embodiments of the present disclosure.

FIG. 10 is a flowchart illustrating an exemplary process for modifying a determined exposure gain ratio according to some embodiments of the present disclosure. In some embodiments, the process 1000 may be implemented in the imaging system 100 illustrated in FIG. 1. For example, the process 1000 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting. In some embodiments, the processing device 120 may perform operation 820 of the process 800 in FIG. 8 based on the process 1000.

In 1010, the processing device 120 (e.g., the gain ratio determination module 440) may obtain a plurality of previous reference gain ratios. The currently determined reference gain ratio may correspond to a current frame. Each of the plurality of previous reference gain ratios may correspond to one of a plurality of successive previous frames before the current frame. In some embodiments, the current frame may be immediately after the plurality of successive previous frames. The processing device 120 have generated the plurality of successive previous frames based on the methods for image combination disclosed in the present disclosure (e.g., at least one of the processes 500 and 700-1200). During the process for generating the previous frames, the previous reference gain ratios may be determined and stored in the storage medium (e.g., the storage device 140, the storage 203, the memory 360, or the storage 390) of the imaging system 100. The processing device 120 may access the storage medium to obtain the previous reference gain ratios.

In 1020, the processing device 120 (e.g., the gain ratio determination module 440) may determine a count of times that the exposure gain ratio is successively larger or successively smaller by comparing the exposure gain ratio to the reference gain ratio and the plurality of previous reference gain ratios, respectively. Further, the processing device 120 may determine a count of times, in chronological order starting from the current frame, that the exposure gain ratio is successively larger or successively smaller.

In 1030, the processing device 120 (e.g., the gain ratio determination module 440) may determine whether the count of times is larger than a frame threshold. In response to a determination that the count of times is less than or equal to the frame threshold, the processing device 120 may keep the exposure gain ratio. In response to a determination that the count of times is larger than the frame threshold, the processing device 120 may decrease or increase the exposure gain ratio to make the exposure gain ratio closer to the reference gain ratio. For example, in response to a determination that the count of times that the exposure gain ratio is successively larger is larger than the frame threshold, the processing device 120 may decrease the exposure gain ratio by, for example, 1, 0.1, 0.01, etc. In response to a determination that the count of times that the exposure gain ratio is successively smaller is larger than the frame threshold, the processing device 120 may increase the exposure gain ratio by, for example, 1, 0.1, 0.01, etc. In some embodiments, the absolute value of the difference between the modified exposure gain ratio and the reference gain ratio may be less than that between the exposure gain ratio before the modification and the reference gain ratio.

In some embodiments, if the processing device 120 modifies the determined exposure gain ratio, the processing device 120 may perform operation 570 based on the modified exposure gain ratio.

The process for modifying the determined exposure gain ratio based on an algorithm relating to successive frames and/or adaptive adjustment may lead to a more accurate exposure gain ratio, which may improve the quality of the combined image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
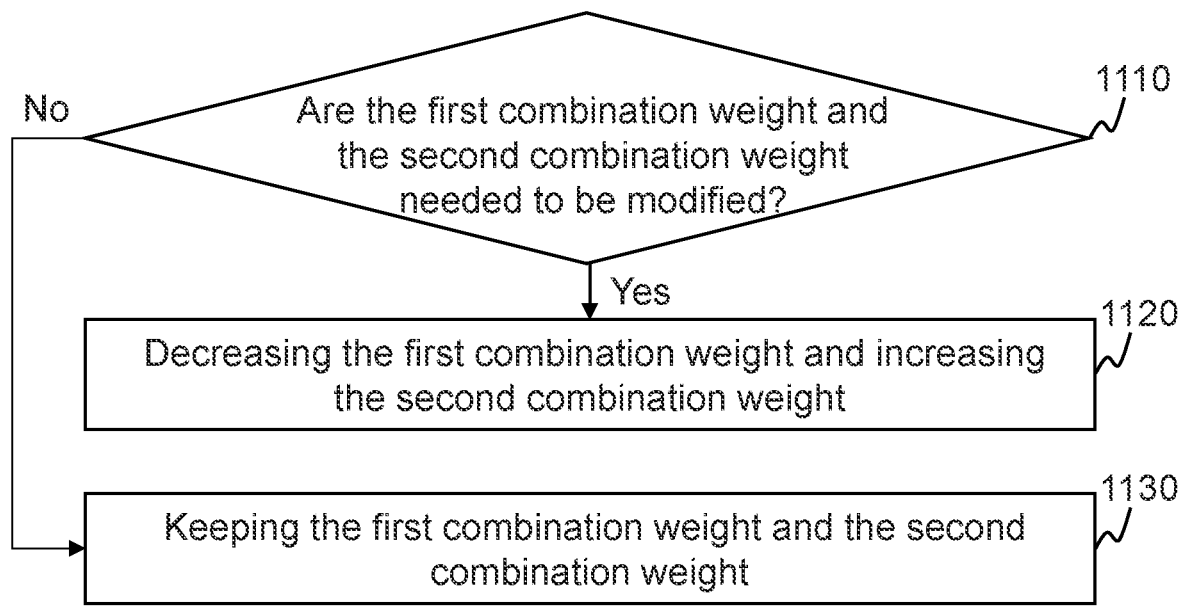
FIG. 11 is a flowchart illustrating an exemplary process for modifying a first combination weight and a second combination weight according to some embodiments of the present disclosure.

FIG. 11 is a flowchart illustrating an exemplary process for modifying a first combination weight and a second combination weight according to some embodiments of the present disclosure. In some embodiments, the process 1100 may be implemented in the imaging system 100 illustrated in FIG. 1. For example, the process 1100 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In some embodiments, the processing device 120 may perform the process 1100 after operation 570 to modify the determined first and second combination weights.

For brevity, the description of the modification of the first combination weight and the second combination weight may take one of the plurality of first image blocks and the corresponding second image block as an example. The first combination weights of the other first image blocks and the second combination weights of the other second image blocks may be modified in the same way.

In 1110, the processing device 120 (e.g., the combination weight determination module 450) may determine whether the first combination weight and the second combination weight are needed to be modified. In some embodiments, the processing device 120 may determine whether the first combination weight and the second combination weight are needed to be modified based on luminance information of the first image block. For example, the processing device 120 may determine whether one or more modification conditions are satisfied. In response to a determination that the one or more modification conditions are satisfied, the processing device 120 may determine that the first combination weight and the second combination weight are needed to be modified. In response to a determination that the one or more modification conditions are not satisfied, the processing device 120 may keep the first combination weight and the second combination weight.

In some embodiments, the one or more modification conditions may include that a count of pixels in the first image block of which luminance values are larger than a seventh threshold is greater than an eighth threshold. In some embodiments, the one or more modification conditions may further include that the first combination weight and the second combination weight are allowed to be modified, and/or that the first mapping weight is greater than a ninth threshold and the second mapping weight is less than a tenth threshold. In some embodiments, the ninth threshold may be equal to the fifth threshold. The tenth threshold may be equal to the sixth threshold.

In response to a determination that the first combination weight and the second combination weight are needed to be modified, the process 1100 may proceed to operation 1120 in which the processing device 120 may decrease the first combination weight and increase the second combination weight. For example, the processing device 120 may increase the second combination weight to a preset value and modify the first combination weight to a value equal to a difference between the fixed value and the preset value. In response to a determination that the first combination weight and the second combination weight are not needed to be modified, the process 1100 may proceed to operation 1130 in which the processing device 120 may keep the first combination weight and the second combination weight.

In some embodiments, if the processing device 120 modifies the determined first and second combination weights, the processing device 120 may perform operation 580 based on the modified first and second combination weights.

The modification of the determined first and second combination weights based on luminance information may reduce or avoid one or more regions with relatively high luminance (e.g., a specular highlight) in the combined image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 12:
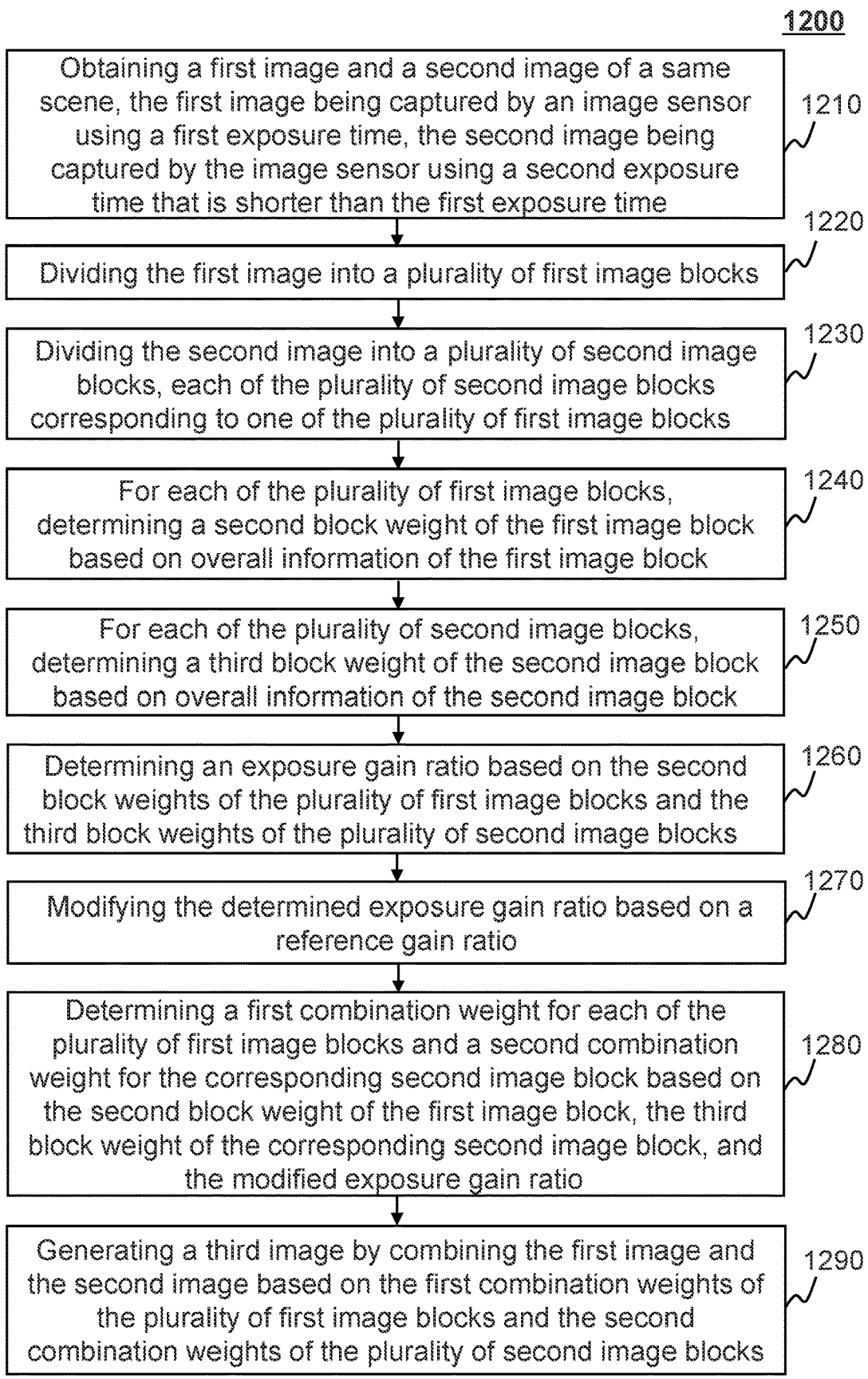
FIG. 12 is a flowchart illustrating an exemplary process for image combination according to some embodiments of the present disclosure.

FIG. 12 is a flowchart illustrating an exemplary process for image combination according to some embodiments of the present disclosure. In some embodiments, the process 1200 may be implemented in the imaging system 100 illustrated in FIG. 1. For example, the process 1200 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In some embodiments, in the process 1300 for image combination, the processing device 120 may determine the first combination weight and the second combination weight based on the overall information of the first image and the second image, without considering the edge information of the plurality of first image blocks of the first image.

In 1210, the processing device 120 (e.g., the image obtaining module 410) may obtain a first image and a second image of a same scene. The first image may be captured by an image sensor of the image capture device 110 using a first exposure time. The second image may be captured by the image sensor of the image capture device 110 using a second exposure time that is shorter than the first exposure time.

In 1220, the processing device 120 (e.g., the image dividing module 420) may divide the first image into a plurality of first image blocks.

In 1230, the processing device 120 (e.g., the image dividing module 420) may divide the second image into a plurality of second image blocks. In some embodiments, each of the plurality of second image blocks may correspond to one of the plurality of first image blocks.

In 1240, the processing device 120 (e.g., the block weight determination module 420) may determine, for each of the plurality of first image blocks, a second block weight of the first image block based on overall information of the first image block.

In 1250, the processing device 120 (e.g., the block weight determination module 420) may determine, for each of the plurality of second image blocks, a third block weight of the second image block based on overall information of the second image block.

In some embodiments, there may be one or more weights corresponding to an image block (e.g., the first image block or the second image block). For example, in the embodiment of the process 500 for image combination in FIG. 5, the processing device 120 may determine two weights for each first image block (e.g., the first block weight relating to the edge information of the first image block and the second block weight relating to the overall information of the first image block) and determine one weight for each second image block (e.g., the third block weight relating to the overall information of the second image block). As another example, in the embodiment of the process 1200 for image combination, the processing device 120 may determine one weight for each first image block (e.g., the second block weight relating to the overall information of the first image block) and determine one weight for each second image block (e.g., the third block weight relating to the overall information of the second image block).

In 1260, the processing device 120 (e.g., the gain ration determination module 440) may determine an exposure gain ratio based on the second block weights of the plurality of first image blocks and the third block weights of the plurality of second image blocks.

Details related to operations 1210-1260 may be the same as the description in connection with operations 510-560 of the process 500 in FIG. 5. For example, the processing device 120 may perform operation 1260 based on the process 700 in FIG. 7.

In 1270, the processing device 120 (e.g., the gain ration determination module 440) may modify the determined exposure gain ratio based on a reference gain ratio. In some embodiments, the processing device 120 may perform operation 1270 based on at least one of the processes 800-1000.

In 1280, the processing device 120 (e.g., the combination weight determination module 450) may determine a first combination weight for each of the plurality of first image blocks and a second combination weight for the corresponding second image block based on the second block weight of the first image block, the third block weight of the corresponding second image block, and the modified exposure gain ratio. In some embodiments, a sum of the first combination weight of the first image block and the second combination weight of the corresponding second image block may be a fixed value (e.g., 1).

For brevity, the description of the determination of the first combination weight and the second combination weight in the process 1200 may take one of the plurality of first image blocks and the corresponding second image block as an example. The first combination weights of the other first image blocks and the second combination weights of the other second image blocks may be determined in the same way.

In some embodiments, the processing device 120 may determine a third mapping weight by performing a third mapping operation based on the second block weight.

In some embodiments, according to a mapping curve between the third mapping weight and the second block weight, the processing device 120 may determine the third mapping weight using Equation (19) below:

$$W3 = (P2 - thr\_3) \times k\_3, \quad (19)$$

wherein W3 refers to the third mapping weight; P2 refers to the second block weight; thr_3 refers to a threshold related to the second block weight; and k_3 refers to the slope of the mapping curve between the third mapping weight and the second block weight. In some embodiments, k_1, k_2, and k_3 may be the same or different.

In some embodiments, the processing device 120 may determine a second mapping weight by performing a second mapping operation based on the third block weight and the exposure gain ratio. Details related to the determination of the second mapping weight may be the same as the related description in connection with operation 570 of the process 500 in FIG. 5.

In some embodiments, the processing device 120 may determine a product of the third mapping weight and the second mapping weight as the second combination weight. For example, the processing device 120 may determine the second combination weight based on Equation (20) below:

$$sw\_final\_2 = W3 * W2 \quad (20).$$

The processing device 120 may determine a difference between the fixed value and the second combination weight as the first combination weight.

In 1290, the processing device 120 (e.g., the combination module 460) may generate a third image by combining the first image and the second image based on the first combination weights of the plurality of first image blocks and the second combination weights of the plurality of second image blocks. Details related to the generation of the third image may be the same as the description in connection with operation 580 of the process 500 in FIG. 5.

In some embodiments, after generating the third image, the processing device 120 may output the third image. For example, during a process for capturing a video, the processing device 120 may output the third image as a frame of the video.

In some embodiments, after operation 1280, the processing device 120 may determine whether the determined first and second combination weights are needed to be modified based on, for example, the process 1100 in FIG. 11. In response to a determination that the determined first and second combination weights are needed to be modified, the processing device 120 may modify the determined first and second combination weights and perform operation 1290 based on the modified first and second combination weights.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1270 may be omitted. The processing device 120 may perform operation 1280 based on the exposure gain ratio determined in operation 1260.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for image combination, comprising:
    at least one storage device storing a set of instructions; and
    at least one processor in communication with the at least one storage device, wherein when executing the set of instructions, the at least one processor is configured to perform operations including:
        obtaining a first image and a second image of a same scene, the first image being captured by an image sensor using a first exposure time, the second image being captured by the image sensor using a second exposure time that is shorter than the first exposure time;
        dividing the first image into a plurality of first image blocks;
        dividing the second image into a plurality of second image blocks, each of the plurality of second image blocks corresponding to one of the plurality of first image blocks;
        for each of the plurality of first image blocks, determining a first block weight of the first image block based on edge information of the first image block and determining a second block weight of the first image block based on overall information of the first image block;
        for each of the plurality of second image blocks, determining a third block weight of the second image block based on overall information of the second image block;
        determining an exposure gain ratio based on the second block weights of the plurality of first image blocks and the third block weights of the plurality of second image blocks;
        determining a first combination weight for each of the plurality of first image blocks and a second combination weight for the corresponding second image block based on the first block weight of the first image block, the third block weight of the corresponding second image block, and the exposure gain ratio, a sum of the first combination weight of the first image block and the second combination weight of the corresponding second image block being a fixed value; and
        generating a third image by combining the first image and the second image based on the first combination weights of the plurality of first image blocks and the second combination weights of the plurality of second image blocks.

2. The system of claim 1, wherein the determining the first block weight for each of the plurality of first image blocks based on the edge information of the first image block includes:
    determining at least one edge pixel group, the edge pixel group including a corner pixel of the first image block and pixels of the first image block adjacent to the corner pixel;
    for each of the at least one edge pixel group, determining a sum of pixel values of the pixels in the edge pixel group;
    determining a maximum among the sums of pixel values of the at east one edge pixel group; and
    determining the first block weight based on the maximum and one or more center pixels of the first image block.

3. The system of claim 2, wherein the first block weight is determined based on:

$$P1\_max = (L\text{sum\_max} + Lc)/n,$$

wherein P1_max refers to the first block weight; Lsum_max refers to the maximum among the sums of pixel values of the at least one edge pixel group; Lc refers to a pixel value of the center pixel; and n refers to a total count of pixels in the edge pixel group and the center pixel.

4. The system of claim 1, wherein the determining the second block weight for each of the plurality of first image blocks based on the overall information of the first image block includes:
  determining the second block weight by determining a weighted average of pixel values of pixels in the first image block; and
  wherein the determining the third block weight for each of the plurality of second image blocks based on the overall information of the second image block includes:
  determining the third block weight by determining a weighted average of pixel values of pixels in the second image block.

5. The system of claim 1, wherein the determining the exposure gain ratio based on the second block weights of the plurality of first image blocks and the third block weights of the plurality of second image blocks includes:
  by traversing the first image and the second image,
    determining a first count, the first count being a count of second block weights that are larger than a first threshold and less than a second threshold;
    determining a second count, the second count being a count of second block weights that are larger than or equal to the second threshold and less than or equal to a third threshold;
    determining a first statistic, the first statistic being a sum of second block weights that are larger than the first threshold and less than the second threshold;
    determining a second statistic, the second statistic being a sum of third block weights corresponding to the second block weights that are larger than the first threshold and less than the second threshold;
    determining a third statistic, the third statistic being a sum of second block weights that are larger than or equal to the second threshold and less than or equal to the third threshold; and
    determining a fourth statistic, the fourth statistic being a sum of third block weights corresponding to the second block weights that are larger than or equal to the second threshold and less than or equal to the third threshold; and
  determining the exposure gain ratio by performing a linear fitting operation based on the first count, the second count, the first statistic, the second statistic, the third statistic, and the fourth statistic.

6. The system of claim 5, wherein the exposure gain ratio is determined based on:

$$\text{gain}\_a = \frac{\frac{y2}{n2} - \frac{y1}{n1}}{\frac{x2}{n2} - \frac{x1}{n1}} = \frac{y2^*n1 - y1^*n2}{x2^*n1 - x1^*n2},$$

wherein gain_a refers to the exposure gain ratio; n1 refers to the first count; n2 refers to the second count; y1 refers to the first statistic; x1 refers to the second statistic; y2 refers to the third statistic; and x2 refers to the fourth statistic.

7. The system of claim 5, wherein the determining the exposure gain ratio based on the second block weights of the plurality of first image blocks and the third block weights of the plurality of second image blocks further includes:
  determining a reference gain ratio based on the first statistic, the second statistic, the third statistic, and the fourth statistic;
  determining a count of times that the exposure gain ratio is successively larger or successively smaller by comparing the exposure gain ratio to the reference gain ratio and a plurality of previous reference gain ratios, respectively, the reference gain ratio relating to a current frame, the plurality of previous reference gain ratios relating to a plurality of successive frames before the current frame;
  determining whether the count of times is larger than a frame threshold;
  in response to a determination that the count of times that the exposure gain ratio is successively larger is greater than the frame threshold, decreasing the exposure gain ratio; and
  in response to a determination that the count of times that the exposure gain ratio is successively smaller is greater than the frame threshold, increasing the exposure gain ratio.

8. The system of claim 7, wherein the determining the reference gain ratio based on the first statistic, the second statistic, the third statistic, and the fourth statistic includes;
  determining a first gain ratio by determining a ratio of the first statistic to the second statistic;
  determining a second gain ratio by determining a ratio of the third statistic to the fourth statistic;
  determining a third gain ratio by determining an average of the first gain ratio and the second gain ratio;
  determining a preliminary gain ratio based on the first exposure time and the second exposure time; and
  determining the reference gain ratio based on the first gain ratio, the second gain ratio, the third gain ratio, and the preliminary gain ratio.

9. The system of claim 8, wherein the determining the reference gain ratio based on the first gain ratio, the second gain ratio, the third gain ratio, and the preliminary gain ratio includes:
  determining whether the preliminary gain ratio is between the first gain ratio and the second gain ratio;
  in response to a determination that the preliminary gain ratio is between the first gain ratio and the second gain ratio, determining the preliminary gain ration as the reference gain ratio;
  in response to a determination that the preliminary gain ratio is outside a range between the first gain ratio and the second gain ratio, determining whether an absolute value of a difference between the preliminary gain ratio and the third gain ratio is less than a fourth threshold;
  in response to a determination that the absolute value is less than the fourth threshold, determining the preliminary gain ration as the reference gain ratio; and
  in response to a determination that the absolute value is larger than or equal to the fourth threshold, determining the third gain ration as the reference gain ratio.

10. The system of claim 1, wherein the determining the first combination weight for each of the plurality of first image blocks and the second combination weight for the corresponding second image block based on the first block weight of the first image block, the third block weight of the corresponding second image block, and the exposure gain ratio includes:
  determining a first mapping weight by performing a first mapping operation based on the first block weight;
  determining a second mapping weight by performing a second mapping operation based on the third block weight and the exposure gain ratio;

determining a product of the first mapping weight and the second mapping weight as the second combination weight; and determining a difference between the fixed value and the second combination weight as the first combination weight.

11. The system of claim 10, wherein the first mapping weight s determined based on:

$$W1=(P1\_max-thr\_1) \times k\_1,$$

wherein W1 refers to the first mapping weight; P1_max refers to the first block weight of the first image block; thr_1 refers to a fifth threshold; and k_1 refers to a first mapping slope; and wherein the second mapping weight is determined based on:

$$W2=(P3 \times gain\_a-thr\_2) \times k\_2,$$

wherein W2 refers to the second mapping weight; P3 refers to the third block weight of the corresponding second image block; thr_2 refers to a sixth threshold; and k_2 refers to a second mapping slope.

12. The system of claim 1, wherein when executing the set of instructions, the at least one processor is configured to perform additional operations including:

before generating the third image, for each of the plurality of first image blocks and the corresponding second image block, determining, based on luminance information of the first image block, whether the first combination weight and the second combination weight are needed to be modified; and in response to a determination that the first combination weight and the second combination weight are needed to be modified, increasing the second combination weight and decreasing the first combination weight.

13. The system of claim 12, wherein the determining, based on luminance information of the first image block, whether the first combination weight and the second combination weight are needed to be modified includes:

determining whether one or more modification conditions are satisfied, the one or more modification conditions including that a count of pixels in the first image block of which luminance values are larger than a seventh threshold is greater than an eighth threshold, and in response to a determination that the one or more modification conditions are satisfied, determining that the first combination weight and the second combination weight are needed to be modified.

14. The system of claim 13, wherein the one or more modification conditions further include that the first combination weight and the second combination weight are allowed to be modified, and/or that the first mapping weight is greater than a ninth threshold and the second mapping weight is less than a tenth threshold.

15. The system of claim 12, wherein the increasing the second combination weight and the decreasing the first combination weight includes:

increasing the second combination weight to a preset value; and modifying the first combination weight to a value equal to a difference between the fixed value and the preset value.

16. The system of claim 1, wherein the third image is generated using bilinear interpolation based on:

$$Newdata = \sum_{i=1}^{m} [(data\_2_i \times gain\_a) \times sw\_final\_2_p + data\_1_i \times sw\_final\_2_p],$$

wherein Newdata refers to pixel values of pixels in the third image; m refers to a count of the pixels in the third image, and m is an positive integer larger than 1; data_1$_i$ refers to a pixel value of a pixel i in the first image block p of the first image; data_2$_i$ refers to a pixel value of the pixel in the second image corresponding to the pixel i in the first image; gain_a refers to the exposure gain ratio; sw_final_1$_p$ refers to the first combination weight of the first image block p; sw_final_2$_p$ refers to the second combination weight of the second image block corresponding to the first image block p; and a sum of sw_final_1$_p$ and sw_final_2$_p$ is equal to the fixed value.

17. A method for image combination implemented on a machine having one or more processors and one or more storage devices, the method comprising:

obtaining a first image and a second image of a same scene, the first image being captured by an image sensor using a first exposure time, the second image being captured by the image sensor using a second exposure time that is shorter than the first exposure time;

dividing the first image into a plurality of first image blocks;

dividing the second image into a plurality of second image blocks, each of the plurality of second image blocks corresponding to one of the plurality of first image blocks;

for each of the plurality of first image blocks, determining a first block weight of the first image block based on edge information of the first image block and determining a second block weight of the first image block based on overall information of the first image block;

for each of the plurality of second image blocks, determining a third block weight of the second image block based on overall information of the second image block;

determining an exposure gain ratio based on the second block weights of the plurality of first image blocks and the third block weights of the plurality of second image blocks;

determining a first combination weight for each of the plurality of first image blocks and a second combination weight for the corresponding second image block based on the first block weight of the first image block, the third block weight of the corresponding second image block; and the exposure gain ratio, a sum of the first combination weight of the first image block and the second combination weight of the corresponding second image block being a fixed value; and generating a third image by combining the first image and the second image based on the first combination weights of the plurality of first image blocks and the second combination weights of the plurality of second image blocks.

18. The method of claim 17, wherein the determining the exposure gain ratio based on the second block weights of the plurality of first image blocks and the third block weights of the plurality of second image blocks includes:

by traversing the first image and the second image,
  determining a first count, the first count being a count of second block weights that are larger than a first threshold and less than a second threshold;
  determining a second count, the second count being a count of second block weights that are larger than or equal to the second threshold and less than or equal to a third threshold;
  determining a first statistic, the first statistic being a sum of second block weights that are larger than the first threshold and less than the second threshold;
  determining a second statistic, the second statistic being a sum of third block weights corresponding to the second block weights that are larger than the first threshold and less than the second threshold;
  determining a third statistic, the third statistic being a sum of second block weights that are larger than or equal to the second threshold and less than or equal to the third threshold; and
  determining a fourth statistic, the fourth statistic being a sum of third block weights corresponding to the second block weights that are larger than or equal to the second threshold and less than or equal to the third threshold; and
determining the exposure gain ratio by performing a linear fitting operation based on the first count, the second count, the first statistic, the second statistic, the third statistic, and the fourth statistic.

19. The method of claim 17, further comprising:
before generating the third image, for each of the plurality of first image blocks and the corresponding second image block, determining, based on luminance information of the first image block, whether the first combination weight and the second combination weight are needed to be modified; and
in response to a determination that the first combination weight and the second combination weight are needed to be modified, increasing the second combination weight and decreasing the first combination weight.

20. A non-transitory computer readable medium, comprising at least one set of instructions for image combination, wherein when executed by one or more processors of a computing device, the at least one set of instructions causes the computing device to perform a method, the method comprising:
  obtaining a first image and a second image of a same scene, the first image being captured by an image sensor using a first exposure time, the second image being captured by the image sensor using a second exposure time that is shorter than the first exposure time;
  dividing the first image into a plurality of first image blocks;
  dividing the second image into a plurality of second image blocks, each of the plurality of second image blocks corresponding to one of the plurality of first image blocks;
  for each of the plurality of first image blocks, determining a first block weight of the first image block based on edge information of the first image block and determining a second block weight of the first image block based on overall information of the first image block;
  for each of the plurality of second image blocks, determining a third block weight of the second image block based on overall information of the second image block;
  determining an exposure gain ratio based on the second block weights of the plurality of first image blocks and the third block weights of the plurality of second image blocks;
  determining a first combination weight for each of the plurality of first image blocks and a second combination weight for the corresponding second image block based on the first block weight of the first image block, the third block weight of the corresponding second image block, and the exposure gain ratio, a sum of the first combination weight of the first image block and the second combination weight of the corresponding second image block being a fixed value; and
  generating a third image by combining the first image and the second image based on the first combination weights of the plurality of first image blocks and the second combination weights of the plurality of second image blocks.

* * * * *